United States Patent
Wang et al.

(10) Patent No.: US 12,441,300 B2
(45) Date of Patent: Oct. 14, 2025

(54) PARKING-SPOT IDENTIFICATION AND SELECTION USING RADAR-CENTRIC OCCUPANCY GRID MAPS

(71) Applicant: Aptiv Technologies AG, Schaffhausen (CH)

(72) Inventors: Qian Wang, Westfield, IN (US); Jeremy S. Greene, Indianapolis, IN (US)

(73) Assignee: Aptiv Technologies AG, Schaffhausen (CH)

( * ) Notice: Subject to any disclaimer, the term of this patent is extended or adjusted under 35 U.S.C. 154(b) by 263 days.

(21) Appl. No.: 18/159,612

(22) Filed: Jan. 25, 2023

(65) Prior Publication Data
US 2024/0246529 A1    Jul. 25, 2024

(51) Int. Cl.
*B60W 30/06* (2006.01)
*B62D 15/00* (2006.01)
(Continued)

(52) U.S. Cl.
CPC ....... *B60W 30/06* (2013.01); *B60W 2420/403* (2013.01); *B60W 2420/408* (2024.01);
(Continued)

(58) Field of Classification Search
CPC .......... B60W 30/06; B60W 2420/403; B60W 2420/408; B60W 2552/50;
(Continued)

(56) References Cited

U.S. PATENT DOCUMENTS

| 8,914,173 B2 | 12/2014 | Biondo et al. |
| 9,522,675 B1 | 12/2016 | You et al. |
| (Continued) | | |

FOREIGN PATENT DOCUMENTS

| CN | 113284359 A | 8/2021 |
| CN | 115257712 A | 11/2022 |

OTHER PUBLICATIONS

"Extended European Search Report", EP Application No. 23158945.8, Aug. 29, 2023, 10 pages.
(Continued)

*Primary Examiner* — Nga X Nguyen
(74) *Attorney, Agent, or Firm* — Harness, Dickey & Pierce, P.L.C.

(57) ABSTRACT

This document describes techniques and systems for identifying and selecting a parking spot using radar-centric occupancy grid (RCOG) maps. An example system includes a processor that can identify available parking spots near a host vehicle using sensor data, including a radar occupancy grid (ROG) map. Parking-spot characteristics of each available parking spot are also determined using the sensor data. The processor can then determine a selected parking spot based on the parking-spot characteristics. The processor or another processor can then control operation of the host vehicle to park in the selected parking spot using an assisted-driving or autonomous-driving system and based on the parking-spot characteristics. In this way, the described system can identify, select, and navigate to a parking spot using a RCOG map without having to rely on infrastructure sensors or pass by open spots.

24 Claims, 15 Drawing Sheets

(51) Int. Cl.
    *G01S 17/931*     (2020.01)
    *G06V 20/58*     (2022.01)
    *G08G 1/14*     (2006.01)
    *G08G 1/16*     (2006.01)
    *B62D 15/02*     (2006.01)
    *G01S 13/86*     (2006.01)
    *G01S 13/931*     (2020.01)
    *G01S 15/931*     (2020.01)

(52) U.S. Cl.
    CPC ..... *B60W 2552/50* (2020.02); *B60W 2552/53* (2020.02); *B62D 15/0285* (2013.01); *G01S 13/867* (2013.01); *G01S 13/931* (2013.01); *G01S 2013/9315* (2020.01); *G01S 2015/932* (2013.01); *G01S 17/931* (2020.01); *G06V 20/586* (2022.01); *G08G 1/142* (2013.01); *G08G 1/168* (2013.01)

(58) Field of Classification Search
    CPC  B60W 2552/53; G01S 13/867; G01S 13/931; G01S 15/86; G01S 15/931; G01S 17/931; G01S 2013/9314; G01S 2015/932; B62D 15/0285; G06V 20/586; G08G 1/168; G08G 1/142
    See application file for complete search history.

(56) References Cited

U.S. PATENT DOCUMENTS

| | | |
|---|---|---|
| 9,738,287 B2 | 8/2017 | Bolger et al. |
| 9,914,462 B2 | 3/2018 | Porras et al. |
| 10,870,368 B2 | 12/2020 | Ing et al. |
| 10,957,198 B1 * | 3/2021 | Hao .................. G08G 1/14 |
| 12,145,575 B2 * | 11/2024 | Wang ................ G08G 1/143 |
| 2008/0028055 A1 | 1/2008 | Dolev et al. |
| 2014/0340242 A1 | 11/2014 | Belzner et al. |
| 2017/0026723 A1 | 1/2017 | Wan et al. |
| 2017/0101030 A1 | 4/2017 | Hughes et al. |
| 2017/0197615 A1 * | 7/2017 | Elie .................. B60W 10/20 |
| 2017/0267233 A1 | 9/2017 | Minster et al. |
| 2018/0072181 A1 | 3/2018 | Christen et al. |
| 2018/0354502 A1 | 12/2018 | Yaldo et al. |
| 2019/0101925 A1 * | 4/2019 | Simmons ............ G05D 1/0255 |
| 2019/0333385 A1 | 10/2019 | Wisbrun |
| 2020/0258385 A1 * | 8/2020 | Mahajan ............ G01S 17/931 |
| 2022/0097636 A1 | 3/2022 | Beach et al. |
| 2022/0219679 A1 | 7/2022 | Chen et al. |
| 2023/0195854 A1 * | 6/2023 | Ip ...................... G06T 7/579 |
| | | 701/409 |
| 2025/0002007 A1 * | 1/2025 | Nakamura ........... G06V 10/82 |

OTHER PUBLICATIONS

"Extended European Search Report", European Application No. 22209241.3, Sep. 18, 2023, 5 pages.

Luo, et al., "A Statistical Method for Parking Spaces Occupancy Detection via Automotive Radars", 2017 IEEE 85th Vehicular Technology Conference (VTC Spring), Jun. 4, 2017, 5 pages.

"Extended European Search Report", EP Application No. 22198277.0, Apr. 28, 2023, 9 pages.

* cited by examiner

PARKING-SPOT IDENTIFICATION AND SELECTION USING RADAR-CENTRIC OCCUPANCY GRID MAPS

BACKGROUND

Some vehicles provide autonomous or automated parking to assist drivers. Parking systems, however, often rely on infrastructure sensors, which are limited to specific parking lots and parking garages, to identify and select a parking spot. Other parking systems may use vision sensors (e.g., cameras) to identify open parking spots. These parking systems typically need to pass a parking spot to confirm its availability and dimension details, especially in densely-parked areas where several available parking spots may be occluded by parked vehicles and other objects. In many parking environments (e.g., crowded parking lots), front-in perpendicular parking is more natural and practical requiring detection of open parking spots ahead of the vehicle.

SUMMARY

This document describes techniques and systems for identifying and selecting a parking spot using radar-centric occupancy grid (RCOG) maps. An example system includes a processor that can identify available parking spots near a host vehicle using sensor data, including a radar occupancy grid (ROG) map. Parking-spot characteristics of each available parking spot are also determined using the sensor data. The processor can then determine a selected parking spot based on the parking-spot characteristics. The processor or another processor can then control operation of the host vehicle to park in the selected parking spot using an assisted-driving or autonomous-driving system and based on the parking-spot characteristics. In this way, the described system can identify, select, and navigate to a parking spot using a RCOG map without having to rely on infrastructure sensors or pass by open spots.

This document also describes methods performed by the above-summarized system and other configurations set forth herein and computer-executable instructions and means for performing these methods.

This Summary introduces simplified concepts related to identifying and selecting a parking spot using RCOG maps described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of techniques and systems of parking-spot identification and selection using RCOG maps are described in this document with reference to the following figures. The same numbers are often used throughout the drawings to reference like features and components:

FIGS. 7-1 through 7-8 illustrate example RCOG maps processed and used by the described techniques and systems to identify parking spots;

FIG. 8 illustrates an example method of a parking system to identify and select a parking spot using a RCOG map;

FIGS. 10-1 through 10-3 illustrate example selections of a parking spot using a probabilistic approach in accordance with techniques of this disclosure.

DETAILED DESCRIPTION

Overview

Some vehicles use sensors (e.g., vision-based, radar, lidar, or ultrasonic systems) to provide autonomous or automated parking. These autonomous or automated parking systems generally use back-in parking techniques and need to pass a parking spot to confirm the spot's availability and dimensions. For example, vision-based systems (e.g., cameras) are generally unable to identify available parking spots or characteristics thereof, especially in crowded parking environments where parking spots may be blocked or occluded by parked vehicles.

Other vehicles can provide automated parking assistance by communicating with infrastructure sensors. A car may be equipped with communication devices (e.g., Vehicle-to-Everything (V2X) systems) to communicate with infrastructure sensors in a parking area. Such techniques often select a parking spot based on human factors (e.g., proximity to a building entrance or parking area entrance).

In contrast, this document describes techniques and systems to identify and select a parking spot using a RCOG map. A parking system can use radar sensors (or a radar system and potentially other sensors, including a camera system) on a host vehicle to identify one or more parking spots available near the host vehicle. The parking system uses a ROG map or a RCOG map to identify the available parking spots. The parking system can also use sensor data to determine parking-spot characteristics for each available parking spot. The parking system can then determine a selected parking spot based on the parking-spot characteristics. An assisted-driving or autonomous-driving system can then control the host vehicle to park in the selected parking spot using the parking-spot characteristics. In this way, parking systems can identify and select a parking spot in crowded parking environments and control the host vehicle to perform a more-natural and more-practical front-end parking maneuver.

This example is just one example of the described techniques and systems for identifying and selecting a parking spot using RCOG maps. This document describes other examples and implementations.

Operating Environment

Figure 1:
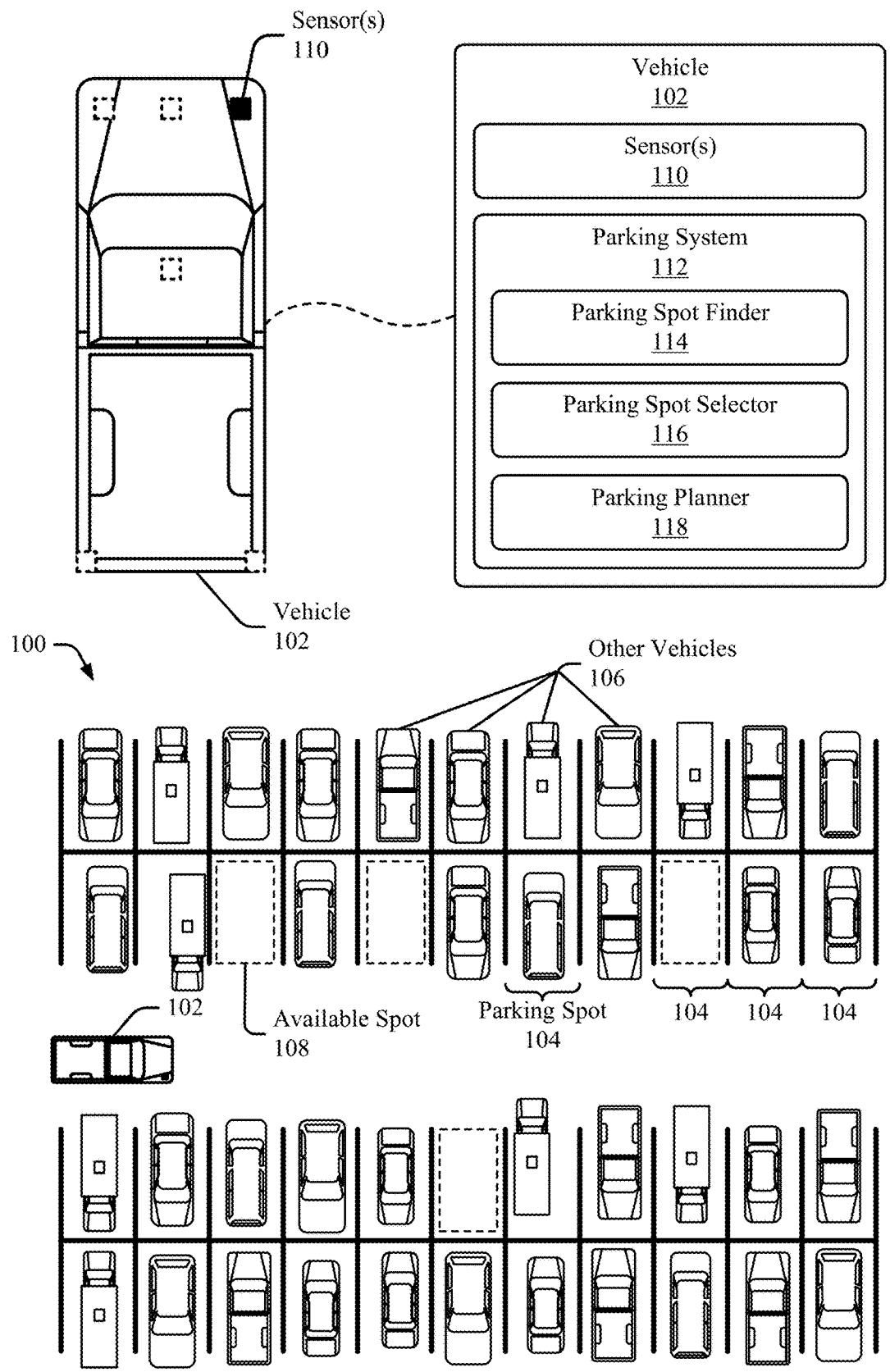
FIG. 1 illustrates an example environment in which a parking system can identify and select a parking spot using a RCOG map in accordance with techniques of this disclosure.

FIG. 1 illustrates an example environment 100 in which a parking system 112 of a vehicle 102 (e.g., a host vehicle)

can identify and select a parking spot 104 using a RCOG map in accordance with the techniques of this disclosure. In the depicted environment 100, the vehicle 102 is in a parking lot or other environment that includes multiple parking spots 104. The parking spots 104 are illustrated in FIG. 1 as being perpendicular to a travel path of the vehicle 102. In other implementations, the parking spots 104 can be at an angle or parallel to the travel path of the vehicle 102. The environment 100 includes other vehicles 106 parked in some of the parking spots 104. The environment 100 also includes multiple available spots 108; in the depicted environment 100, there are four available spots 108 in front of the vehicle 102.

Although illustrated as a passenger truck, the vehicle 102 can represent other types of motorized vehicles (e.g., a car, an automobile, a motorcycle, a bus, a tractor, a semi-trailer truck), watercraft (e.g., a boat), or aircraft (e.g., an airplane). Similarly, the other vehicles 106 can be other types of motorized vehicles, watercraft, aircraft, or other objects located in the parking spots 104 (e.g., dumpsters, shopping carts).

The vehicle 102 includes one or more sensors 110 and the parking system 112. In the depicted environment 100, the sensors 110 are mounted to, or integrated within, a front portion of the vehicle 102. As described in greater detail below, the sensors 110 can include camera systems, radar systems, lidar systems, or ultrasonic systems. The sensors 110 can provide sensor data regarding the parking spots 104, the other vehicles 106, and the available spots 108 to the parking system 112.

In the depicted implementation, the sensors 110 are mounted on the front of the vehicle 102 and provide sensor data for the available spots 108. The sensors 110 can provide the sensor data from any exterior surface of the vehicle 102. For example, vehicle manufacturers can integrate a radar system, a lidar system, camera, or ultrasonic sensor into a bumper, side mirror, headlights, or any other interior or exterior location where objects and parking spots 104 require detection. In some cases, the vehicle 102 includes multiple sensors and/or sensor types, such as a radar system and a camera, that provide a larger instrument field-of-view or improved detection of different parking-spot characteristics. In general, vehicle manufacturers can design the locations of the sensors 110 to provide a particular field-of-view that encompasses a region of interest. Example fields-of-view include a 180-degree field-of-view, one or more 90-degree fields-of-view, and so forth, which can overlap or be combined into a field-of-view of a particular size.

The parking system 112 can provide assisted or autonomous parking to a driver of the vehicle 102. For example, the parking system 112 can identify a selected parking spot (e.g., an optimal parking spot) and a parking maneuver based on parking-spot characteristics determined from the sensor data. The parking-spot characteristics can include a width, an entry turning radius, and a longitudinal distance to each available spot 108. The parking-spot characteristics may also include an index number or other identifying number, vehicle-coordinate-system (VCS) coordinates for the four corners of the available spot 108, Universal Transverse Mercator (UTM) coordinates for the four corners, depth (or length), VCS and/or UTM angle (e.g., relative to a roadway or drivable aisle of the parking environment 100), and neighbor spot or vehicle type. As another example, the parking system 112 can provide an input to an assisted-driving or autonomous-driving system to park the vehicle 102 in one of the available spots 108.

The parking system 112 can include a parking spot finder 114, a parking spot selector 116, and a parking planner 118. The parking system 112, parking spot finder 114, parking spot selector 116, and parking planner 118 can be implemented using hardware, software, firmware, or a combination thereof. The parking spot finder 114 can use the sensor data, including a ROG map, provided by the sensors 110 to identify the available spots 108. The parking spot selector 116 can select a parking spot among the available spots 108 for the vehicle 102 to park in. In this way, the parking spot finder 114 and the parking spot selector 116 can identify and select a parking spot in crowded parking lots and allow the vehicle 102 to perform a more-natural and more-practical front-end parking maneuver. The parking planner 118 can determine a maneuver type (e.g., front-in parking, back-in parking) and maneuver path for parking the vehicle 102 in the selected parking spot. In this way, the parking planner 118 can control the vehicle 102 to perform a parking maneuver without having to pass it.

Figure 2:
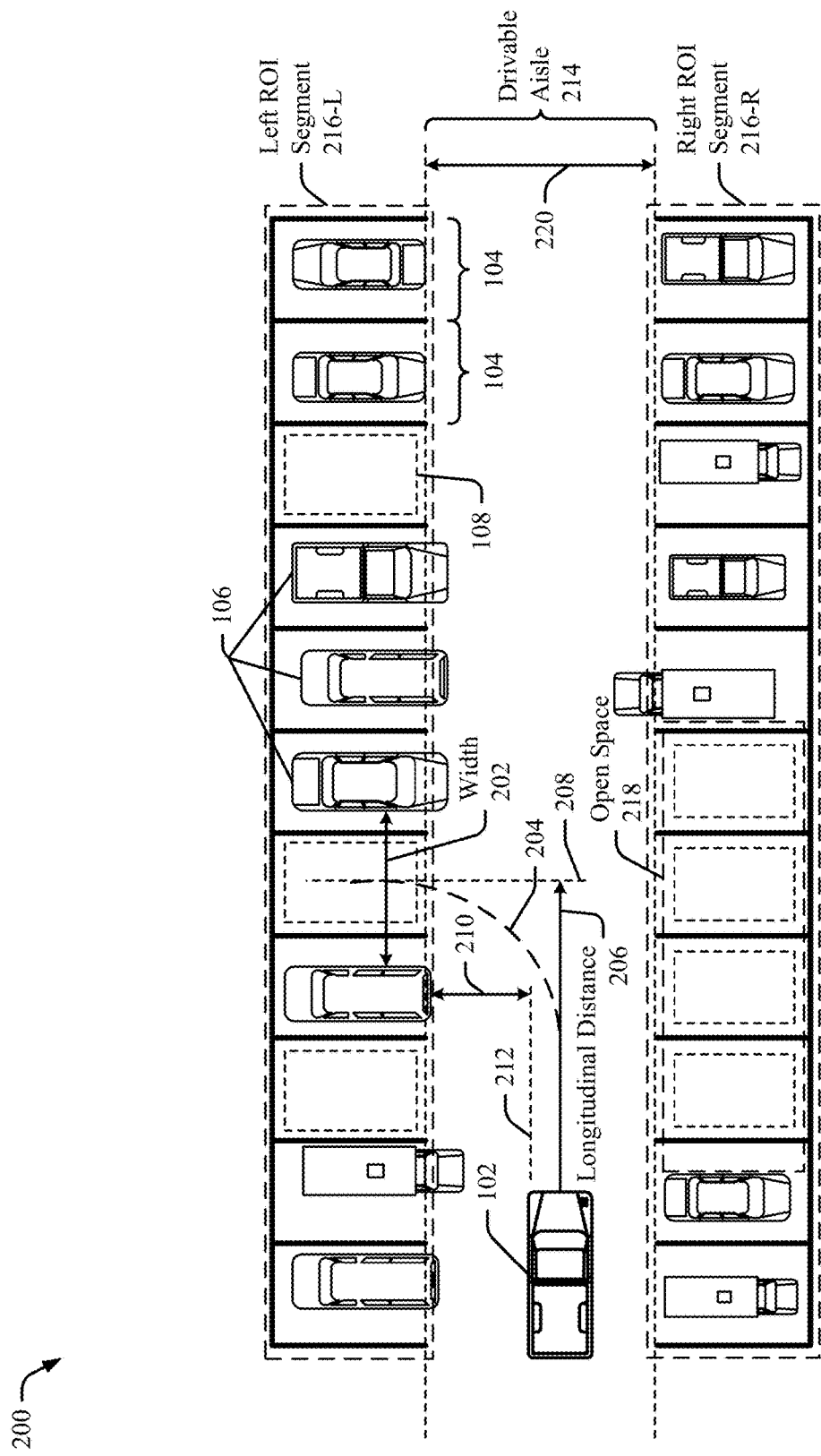
FIG. 2 illustrates another example environment in which a parking system can identify and select a parking spot using a RCOG map in accordance with techniques of this disclosure.

FIG. 2 illustrates another example environment 200 in which the parking system 112 can identify and select a parking spot using a RCOG map in accordance with techniques of this disclosure. Like the environment 100 of FIG. 1, the environment 200 depicts the vehicle 102 in a parking lot with multiple parking spots 104. The parking lot also includes other vehicles 106 and several available spots 108.

Using the sensor data, the sensors 110 or the parking system 112 can generate a RCOG map that the parking spot finder 114 uses to identify the available spots 108 and determine parking-spot characteristics associated with the available spots 108. The parking-spot characteristics can include a width 202, an entry turning radius 204, and a longitudinal distance 206 associated with each available spot 108. The parking system 112 can measure the width 202 associated with an available spot 108 as approximately the distance between the other vehicles 106 parked in the adjacent parking spots. Alternatively, the width 202 can be measured as the lateral distance between the painted lines of the available spot 108 or any other spot with painted lines within the environment 200. If another vehicle 106 is not parked in an adjacent parking spot, then the parking system can use a predetermined distance offset from the parking-spot line as an endpoint for measuring the width 202.

The entry turning radius 204 represents the radius of the travel path to enter the available spot 108 from the current lateral position of the vehicle 102. The entry turning radius 204 can, for example, be defined using a lateral center of the vehicle 102 and a lateral center 208 of the available spot 108. The entry turning radius 204 can be dependent on the width 202 and the longitudinal distance 206. The longitudinal distance 206 can also represent a distance from the front of the vehicle 102 to the lateral center 208 of the available spot 108. The longitudinal distance 206 can also be measured as the distance from the longitudinal position of the rear axle of the vehicle 102 to a left edge of the intended parking position of the vehicle 102 within the available spot 108. The intended parking position can be defined to place the vehicle 102 in a longitudinal center and the lateral center 208 of the available spot 108. The parking system 112 can use different reference points to define or measure the width 202, the entry turning radius 204, and the longitudinal distance 206 associated with the available spots 108.

The parking system 112 can also determine other parking-spot characteristics associated with the available spots 108. For example, the parking system 112 can determine a lateral distance 210 associated with the parking spots. The lateral distance 210 can indicate a distance between another vehicle 106 in an adjacent parking spot and the vehicle 102. In particular, the parking system 112 can measure the distance from an inner edge 212 of the rear axle (e.g., the outside of the rear axle nearest the available spot 108) to the nearest portion of the other vehicle 106 in the adjacent parking spot. The lateral distance 210 can also be measured from a predetermined offset (e.g., a safety distance) from the edges of the parking spots 104. Alternatively, the lateral distance 210 can be measured as the inner edge 212 of the rear axle to an offset distance (e.g., the longitudinal distance between the front axle and rear axle of the vehicle 102) from the nearest portion of the other vehicle 106 in the adjacent parking spot.

The parking system 112 can also identify which side of the vehicle the available spot 108 is located and determine VCS or UTM coordinates for the four corners of the available spot 108, a VCS or UTM angle of the available spot 108 relative to a drivable aisle 214, VCS or UTM coordinates for the front center portion of the available spot 108, a spot depth (e.g., a longitudinal depth of each available spot 108), spot type (e.g., handicapped, compact car, reserved, electric-vehicle only, autonomous-only), neighboring vehicle classification, shading classification, and spot classification. The neighboring vehicle classification can identify the type of vehicles in adjacent parking spots (e.g., luxury or expensive vehicles, compact vehicles). The shading classification can identify whether any shade is currently available or will be available during an expected parking duration. The spot classification can indicate if the available spot 108 is immediately before an occupied spot (e.g., "before"), immediately after an occupied spot (e.g., "after"), between occupied spots (e.g., "between"), before or after, not between, not before or after, several spots away from an occupied spot (e.g., "far away"), an end parking spot (e.g., "end spot"), or some combination thereof. The parking system 112 can also consider other characteristics (e.g., distance to a building associated with the parking lot or a programmed destination, distance from parking lot entrance or exit, parking-spot slope).

As described in greater detail below, the parking spot selector 116 can use the parking-spot characteristics to determine a selected parking spot among multiple available spots 108. Similarly, the parking planner 118 can use the parking-spot characteristics to determine a maneuver type and maneuver path for controlling the operation of the vehicle 102 to park within the selected parking spot.

The parking system 112 or the parking spot finder 114 can use the sensor data, including radar data from one or more radar systems and the RCOG map, to identify or find the available spots 108. In particular, the parking system 112 or the parking spot finder 114 can identify a drivable aisle 214, region-of-interest (ROI) segments 216, and open spaces 218 from the RCOG map. The drivable aisle 214 represents the entry roadway from which the vehicle 102 can enter the parking spots 104. The parking system 112 or the parking spot finder 114 can use vision data to define the sides of the drivable aisle 214 based on the ends of the painted lines for the parking spots 104. Alternatively (e.g., if painted line information is not available or not of sufficient quality), the parking system 112 or the parking spot finder 114 can use sensor data (e.g., radar data) to identify the left-most edge and right-most edge of cluster data (e.g., from parked vehicles or other obstacles) and define the drivable aisle 214. Once the drivable aisle 214 is defined, the parking system 112 or the parking spot finder 114 can also identify an aisle width 220 of the drivable aisle 214 and its heading relative to the travel path of the vehicle 102. The parking system 112 can also determine VCS or UTM coordinates for corners of the drivable aisle 214.

The parking system 112 or the parking spot finder 114 can then use the RCOG map to identify the ROI segments 216 to the lateral sides of the drivable aisle 214. The ROI segments 216 indicate areas in which the parking spots 104 are located. In particular, the parking system 112 or the parking spot finder 114 can identify a left ROI segment 216-L and a right ROI segment 216-R to the left and right, respectively, of the vehicle 102 and the drivable aisle 214.

The parking system 112 or the parking spot finder 114 can use the RCOG map to identify the open spaces 218 within the ROI segments 216. The open spaces 218 represent unoccupied areas between the other vehicles 106 and other objects within the ROI segments 216. As described in greater detail below, the open spaces 218 can be identified as the free space between clusters in the RCOG map. Each open space 218 can include one or more available spots 108.

Similar to the parking-spot characteristics, the parking system 112 can determine open-space characteristics for each open space 218. The open-space characteristics may include a space width, VCS or UTM angle in radians or degrees, VCS or UTM coordinates of the four corners, and/or VCS or UTM coordinates for one or more centers of the open space 218. The parking system 112 can also identify whether a particular open space 218 is next to or includes an end of a ROI segment 216.

Vehicle Configuration

Figure 3:
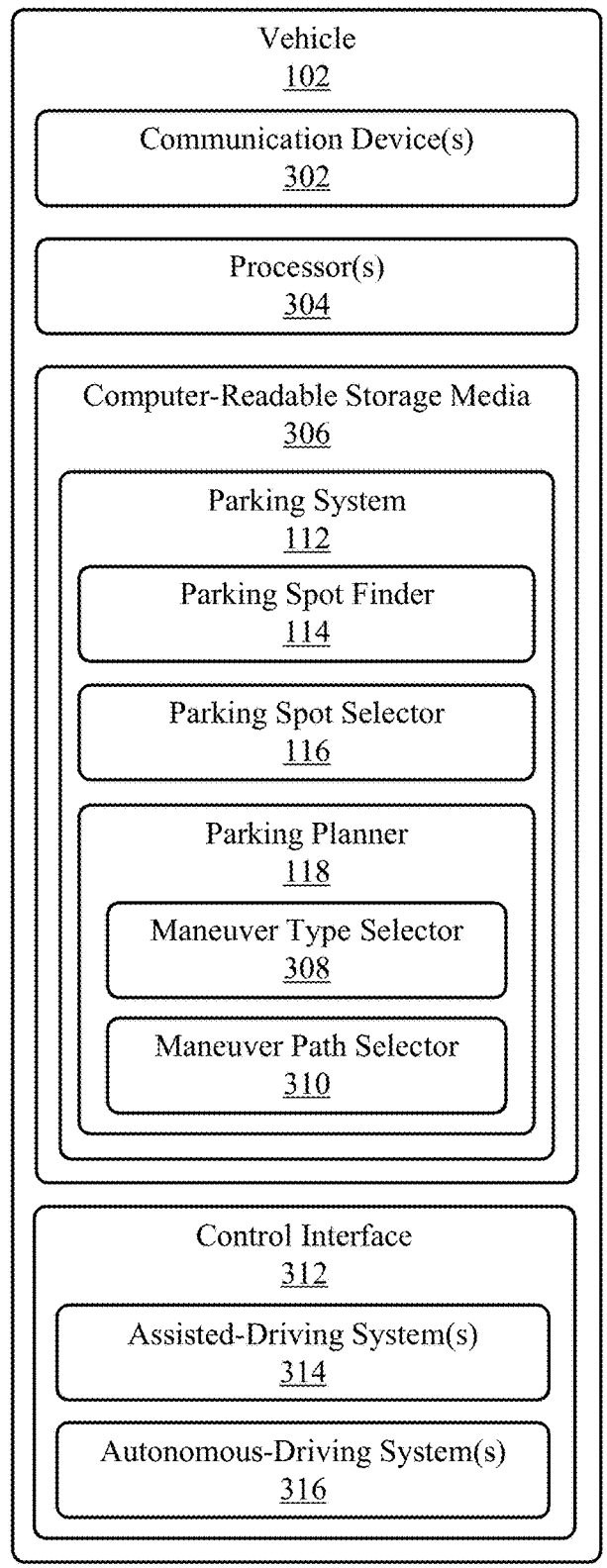
FIGS. 3 and 4 illustrate example configurations of a vehicle with a parking system that can identify and select a parking spot using a RCOG map.

FIG. 3 illustrates an example configuration of a vehicle with a parking system that can identify and select a parking spot using a RCOG map. As described for FIG. 1, the vehicle 102 includes the sensors 110 and the parking system 112, which includes the parking spot finder 114, the parking spot selector 116, and the parking planner 118. In addition, the vehicle 102 can include one or more communication devices 302, one or more processors 304, computer-readable storage media (CRM) 306, and a control interface 312 to one or more vehicle-based systems, including one or more assisted-driving systems 314 and one or more autonomous-driving system 316.

The communication devices 302 can include a sensor interface and a vehicle-based system interface. The sensor interface and the vehicle-based system interface can transmit data (e.g., radar data, RCOG maps, range computations, and other parking-spot characteristics associated with the available spots 108) over a communication bus of the vehicle 102, for example, when the individual components of the sensors 110 and/or the parking system 112 are integrated within the vehicle 102.

The processors 304 (e.g., an energy processing unit or electronic control unit) can be a microprocessor or a system-on-chip. The processors 304 can execute instructions stored in the CRM 306, on one or more disks, memories, or other non-transitory computer-readable storage medium. For example, the processor 304 can process sensor data from the sensors 110 and execute instructions loaded from the CRM 306 to cause the processor 304 to determine parking-spot characteristics for the available spots 108. The instructions may cause the processor 304 to be configured to identify and select a parking spot using the parking system 112 and/or generate a parking maneuver, including the maneuver type and maneuver path, for at least one automotive system. For example, the processor 304 can execute the instructions on the CRM 306 to configure the processor 304 to control, based on sensor data, an autonomous or semi-autonomous driving system of the vehicle 102 to cause the vehicle 102 to park in a selected parking spot.

The parking system 112 can be stored in the CRM 306. As described for FIG. 1, the parking system 112 can include the parking spot finder 114, the parking spot selector 116, and the parking planner 118. The parking spot finder 114 can use sensor data, including a RCOG map, to identify available parking spots. The parking spot selector 116 can select a parking spot (e.g., an optimal parking spot) for the vehicle 102. The selected parking spot can be presented to the driver of the vehicle 102 on a display (e.g., an overlay on a photographic or video feed of the parking environment or a graphical representation of the parking environment). The driver can then navigate and park in the selected parking spot. The driver can also provide an input (e.g., via voice or touch input) to the parking system 112 to have the assisted-driving system 314 or the autonomous-driving system 316 perform the parking maneuver. In this way, the parking spot finder 114 can identify a parking spot in crowded parking lots and the parking spot selector 116 can determine an optimal parking spot. Accordingly, the parking system 112 can cause the vehicle 102 to perform a more-natural and more-practical parking maneuver without having to pass the selected parking spot.

The parking planner 118 includes a maneuver type selector 308 and a maneuver path selector 310. The maneuver type selector 308 can determine a maneuver type (e.g., front-in parking, back-in parking) for parking in the selected parking spot. For example, the maneuver type selector 308 can determine, based on driver preferences or input, to perform a back-in parking maneuver to park in the selected parking spot.

The maneuver path selector 310 can determine a maneuver path for parking in the selected parking spot. As described in greater detail below, the maneuver path selector 310 can determine turning radii for the maneuver path to safely park the vehicle 102. In some implementations, the maneuver path selector 310 can output a suggested maneuver path to a display for the driver to follow for entry into the selected parking spot. In this way, the maneuver type selector 308 and the maneuver path selector 310 can control the vehicle 102 to perform parking maneuvers for crowded or congested parking lots.

The vehicle 102 also includes the control interface 312 to one or more vehicle-based systems, which individually or in combination provide a way for receiving a parking-spot selection and parking maneuver to control the vehicle 102. Some examples of vehicle-based systems to which the control interface 312 supplies parking information include the assisted-driving system 314 and the autonomous-driving system 316; each may rely on information output from the parking system 112.

For example, the vehicle-based systems may rely on data, which is communicated via the communication devices 302 and obtained from the sensors 110, to operate the vehicle 102 (e.g., performing a front-in or back-in parking maneuver). Generally, the control interface 312 can use data provided by the parking system 112 and/or sensors 110 to control operations of the vehicle 102 to park in selected parking spots. The assisted-driving system 314 can alert a driver of a selected parking spot via a display and/or perform a parking maneuver into the selected parking spot. As another example, the autonomous-driving system 316 can navigate the vehicle 102 to park in the selected parking spot.

Figure 4:
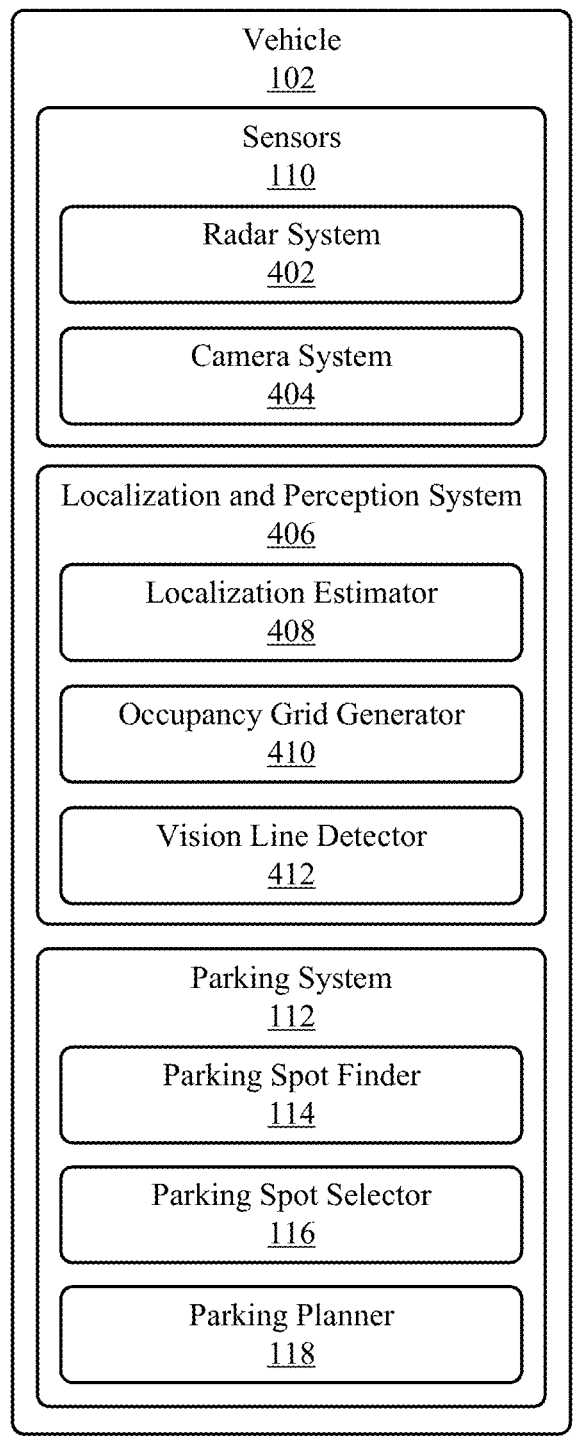

FIG. 4 illustrates another example configuration of a vehicle with a parking system that can identify and select a parking space using a RCOG map. As described for FIGS. 1 and 3, the vehicle 102 includes the sensors 110 and the parking system 112, which includes the parking spot finder 114, the parking spot selector 116, and the parking planner 118. The sensors 110 can include a radar system 402 and a camera system 404. In addition, the vehicle 102 can include a localization and perception system 406, which can include a localization estimator 408, an occupancy grid generator 410, and a vision line detector 412.

The radar system 402 emits EM radiation by transmitting EM signals or waveforms via antenna elements. The radar system 402 can detect and track objects, including the other vehicles 106, by transmitting and receiving one or more radar signals. For example, the radar system 402 can transmit EM signals between one hundred and four hundred gigahertz (GHz), between four and one hundred GHz, or between approximately seventy and eighty GHz. The radar system 402 includes a transmitter to transmit EM signals and a receiver to receive reflected versions of the EM signals. The transmitter includes one or more components, including an antenna or antenna elements, for emitting the EM signals. The receiver includes one or more components, including an antenna or antenna elements, for detecting the reflected EM signals. The transmitter and the receiver can be incorporated together on the same integrated circuit (e.g., a transceiver integrated circuit) or separately on different integrated circuits. In other implementations, the radar system 402 does not include a separate antenna, but the transmitter and the receiver each include one or more antenna elements. The radar system 402 generally has a field of view (e.g., around or greater than thirty degrees) in the elevation dimension (e.g., orthogonal to the roadway of the parking environment 100) sufficient for a ROG map to be generated that indicates the presence of parked vehicles, including those that are not within a direct line-of-sight of the radar system 402, by allowing for detections of EM signals reflected by the roadway. The elevation-dimension field of view allows the radar system 402 to build a two-dimensional ROG map using EM signals that are reflected by the surface of the parking environment 100.

The camera system 404 captures images of a parking environment. The images can be processed to identify parking-spot lines. The camera system 404 may capture the images over time as the vehicle 102 navigates a parking environment and may be located on or around the interior or exterior portion of the vehicle. In an example implementation, the camera system 404 is mounted to a front portion of the vehicle 102, for example, on the front facing portion of a side mirror or rear-view mirror to provide adequate view of the parking-spot lines.

The localization and perception system 406 provide input information for the parking system 112 to identify and select a parking spot. As described above, the localization and perception system 406 includes the localization estimator 408, the occupancy grid generator 410, and the vision line detector 412.

The localization estimator 408 can use sensor data to determine an estimated pose and heading of the vehicle 102. The localization estimator 408 may include a geospatial positioning system (e.g., a global positioning system (GPS), global navigation satellite system (GNSS or GLONASS) sensor), an inertial measurement system (e.g., a gyroscope or accelerometer), or other sensors (e.g., a magnetometer, software positioning engine, wheel tick sensor, lidar odometer, vision odometer, radar odometer, or other sensor odometers). The localization estimator 408 may provide high-accuracy localization data under ideal conditions or low-accuracy localization data under non-ideal conditions (e.g., within a parking garage). For example, the localization estimator 408 can use dead reckoning to provide an estimated pose of the vehicle 102 within a GNSS denial environment. The localization estimator 408 can determine the distance and direction traveled by the vehicle 102 since entering a GNSS denial environment.

The occupancy grid generator 410 provides a ROG map for identifying parking spots in a parking environment. The ROG map is a grid-based representation of radar detections within a parking environment (e.g., a parking garage or parking lot). The radar detections generally include stationary radar detections (e.g., detections of stationary objects from the radar system 402 including signs, poles, barriers, landmarks, buildings, overpasses, curbs, road-adjacent objects such as fences, trees, flora, foliage, or spatial statistical patterns) with corresponding coordinates for respective times and/or locations. The radar detections may comprise point clouds, have corresponding uncertainties, and/or include various radar data or sensor measurements.

The ROG map can be a Bayesian, Dempster Shafter, or other type of occupancy grid. Each cell of the ROG map represents an independent portion of space within the parking environment, and each cell value represents a probability (e.g., 0-100%) that the corresponding portion of space is occupied (e.g., by another vehicle or obstacle). A probability of approximately 0% for a cell may indicate that the corresponding portion of space is free or not currently occupied, while a probability closer to 100% may indicate that the corresponding portion of space is occupied (e.g., by a wall, column, or another vehicle), and therefore, not free space.

The vision line detector 412 processes images obtained from the camera system 404 and identifies parking-spot lines associated with the parking environment. For example, the vision line detector 412 can identify the parking-spot lines demarcating each parking spot 104.

Figure 5:
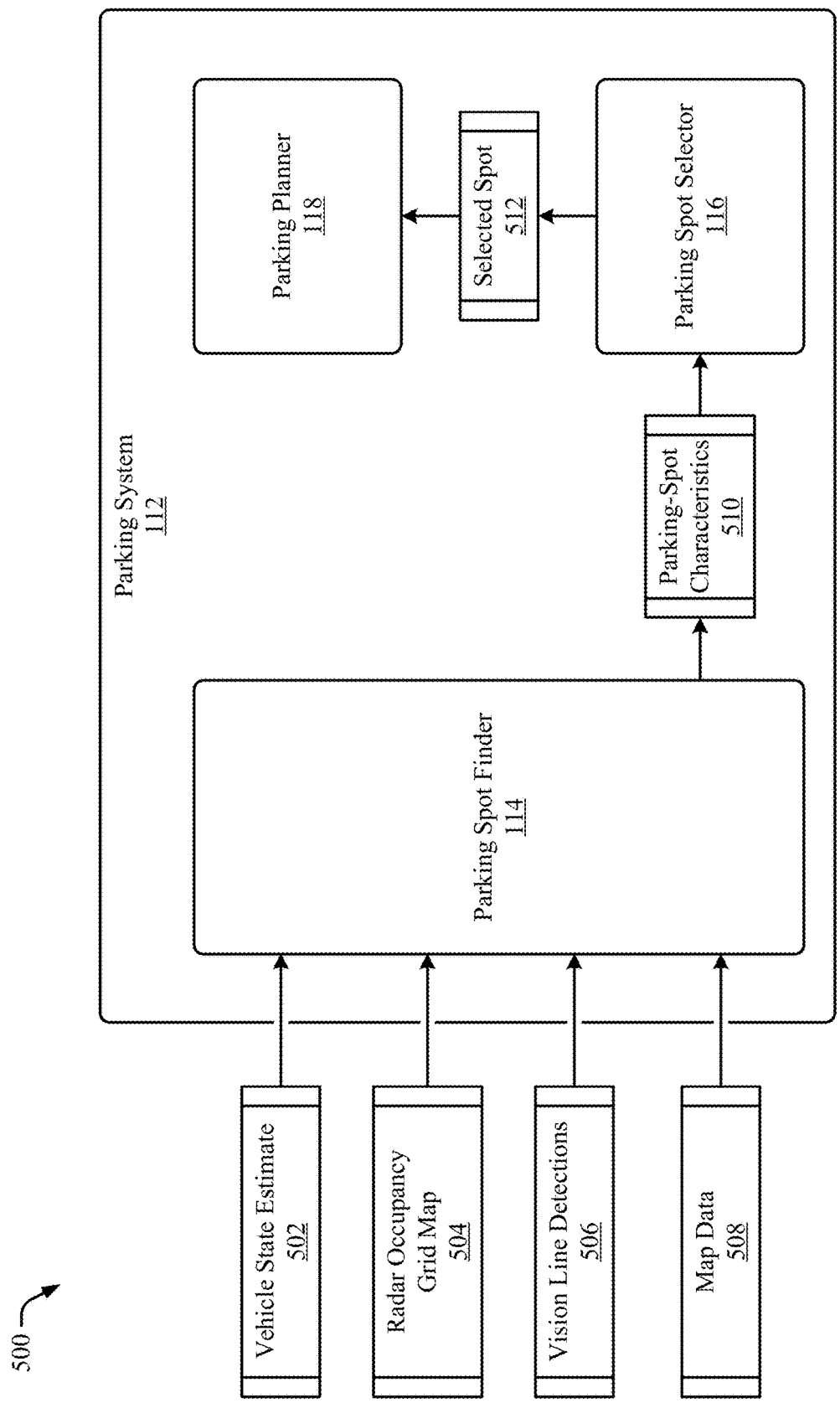
FIG. 5 illustrates an example conceptual diagram of a parking system that can identify and select a parking spot using a RCOG map.

FIG. 5 illustrates an example conceptual diagram 500 of the parking system 112 that can identify and select a parking spot using a RCOG map. As described with respect to FIGS. 1 through 4, the parking system 112 includes the parking spot finder 114, the parking spot selector 116, and the parking planner 118.

As described above, the parking spot finder 114 identifies available spots 108 in a parking environment. Inputs to the parking spot finder 114 may include vehicle state estimates 502, a ROG map 504, vision line detections 506, and/or map data 508. In other implementations, the parking system 112 may receive additional input data from infrastructure sensors, a remote computer system, or other vehicles regarding the parking environment 100.

The vehicle state estimates 502 provide a pose (or location) and heading of vehicle 102. For example, the pose can be in Cartesian coordinates (e.g., UTM coordinates). The vehicle state estimates 502 can be provided by the localization and perception system 406.

The ROG map 504 provides a grid-based representation of radar detections within the parking environment. The ROG map 504 is generally provided in a vehicle coordinate system or sensor coordinate system relative to the vehicle 102 or the radar system 402, respectively. As described above, the ROG map 504 can be a Bayesian, Dempster Shafter, or other type of occupancy-grid map. Each cell of the ROG map 504 represents an independent portion of space within the parking environment, and each cell value of the ROG map 504 represents a probability (e.g., 0-100%) that the corresponding portion of space is occupied (e.g., by another vehicle or obstacle). A probability of approximately 0% for a cell may indicate that the corresponding portion of space is free or not permanently occupied, while a probability closer to 100% may indicate that the corresponding portion of space is occupied (e.g., by a wall, column, or another vehicle), and therefore, not a free space.

The vision line detections 506 provides a representation of painted lines, painted symbols, and other objects within the parking environment. The painted lines may demarcate each parking spot 104 in the parking environment. The painted symbols (e.g., wheelchair symbol, the word "compact") may indicate the type of parking spot 104. The other objects may include permanent objects (e.g., shopping cart carousels, barriers, curbs) occupying one or more parking spots 104. The vision line detections 506 may include the position and angle of the painted lines, painted symbols, and objects in a vehicle coordinate system, global coordinate system, or a sensor coordinate system.

The map data 508 may provide information about lanes, drivable aisles, speed limit, traffic control devices (e.g., stop signs), parking spots 104, parking type (e.g., front-in parking only), drivable-aisle directionality (e.g., alternating one-way aisles), regulations (e.g., vehicle size, time, or duration limits), or other details associated with the parking environment. The parking system 112 or another component of the vehicle 102 may store the map data 508, process updated map data received from a remote source, or retrieve portions of the map data 508 for the parking spot finder 114.

The parking spot finder 114 uses the inputs to identify available spots 108 in the parking environment. The details of the parking-spot finding are described in greater detail with respect to FIG. 6. The parking spot finder 114 provides parking-spot characteristics 510 for each available spot 108. As described in greater detail with respect to FIG. 9, the parking-spot characteristics 510 may include a width, entry turning radius, and longitudinal distance associated with each available spot 108. The parking-spot characteristics 510 may also include an angle of the available spot 108 to the drivable aisle. In some implementations, the parking spot finder 114 converts the position, size, and angle of each available spot 108 into a width, entry turning radius, and longitudinal distance. Using the parking-spot characteristics 510 and as described in greater detail with respect to FIGS. 8 through 10-3, the parking spot selector 116 determines a selected spot 512 for the vehicle 102 to park in and provides the selected spot 512 and the corresponding parking-spot characteristics 510 to the parking planner 118. The parking planner 118 then determines a maneuver type (e.g., front-in parking, back-in parking) and maneuver path for parking the vehicle 102 in the selected spot 512.

Example Method(s) to Identify and Select a Parking Spot

Figure 6:
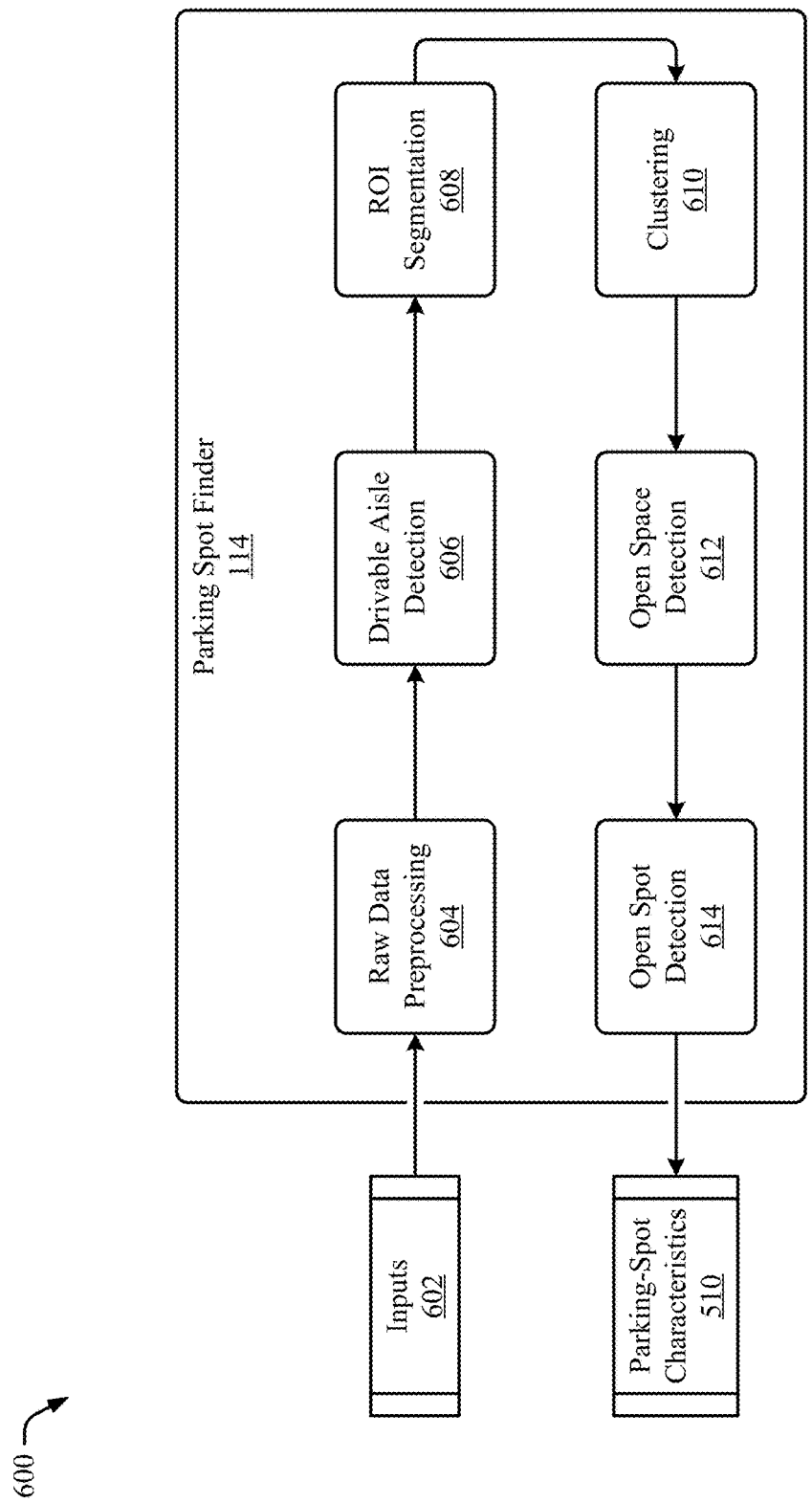
FIG. 6 illustrates an example flowchart of the described techniques and systems to identify parking spots using a RCOG map.
Figures 1, 7:
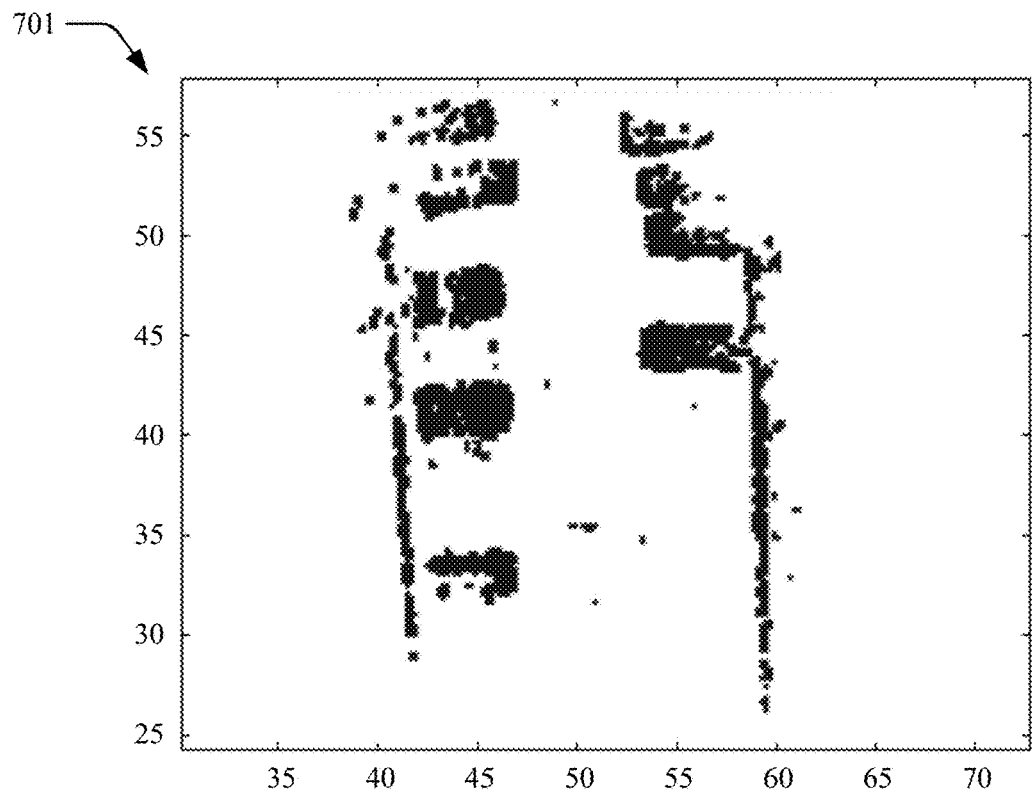
Figures 2, 7:
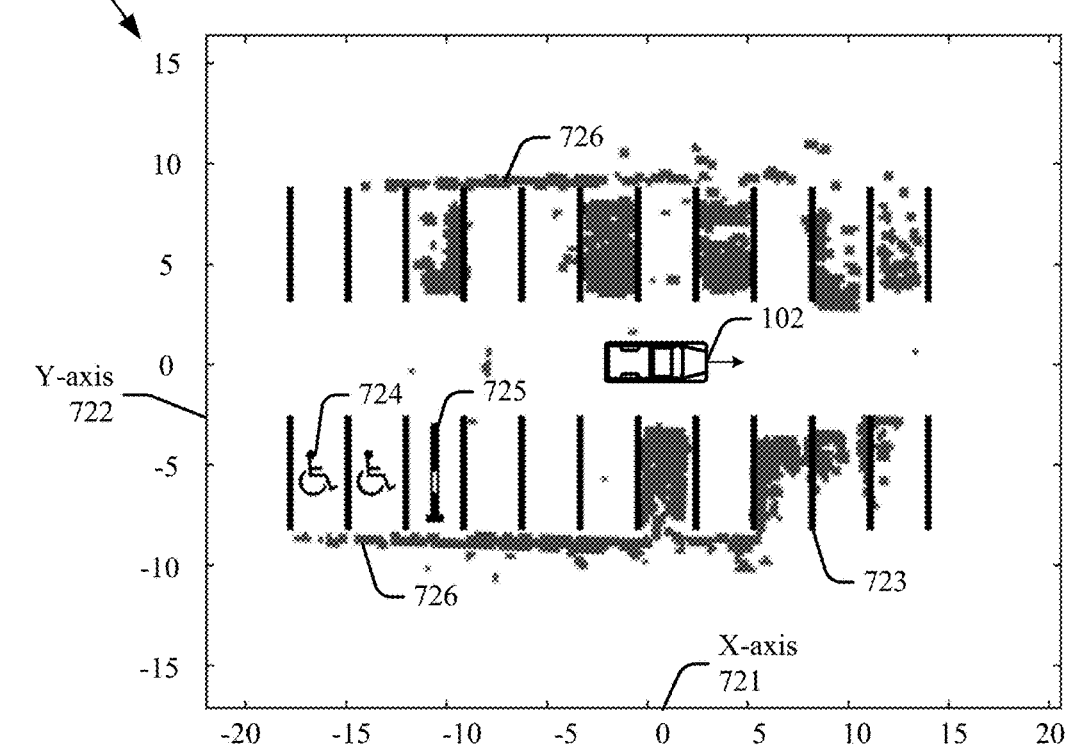
Figures 3, 7:
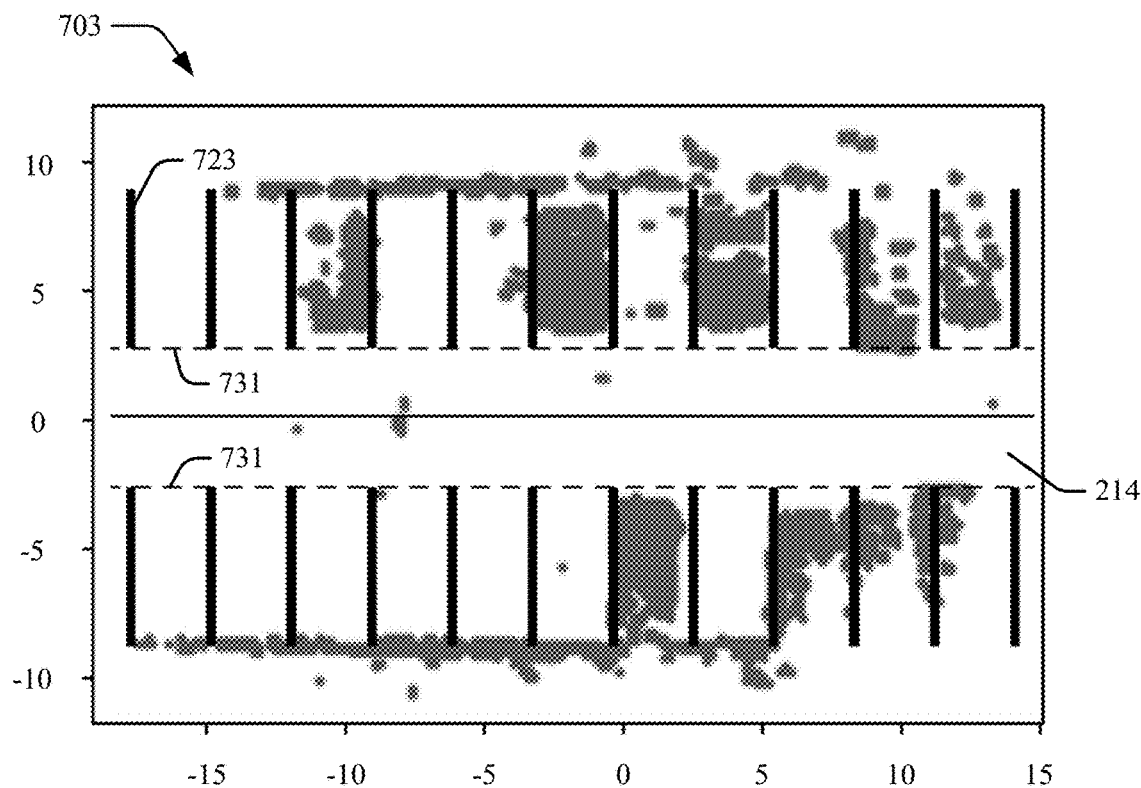
Figures 4, 7:
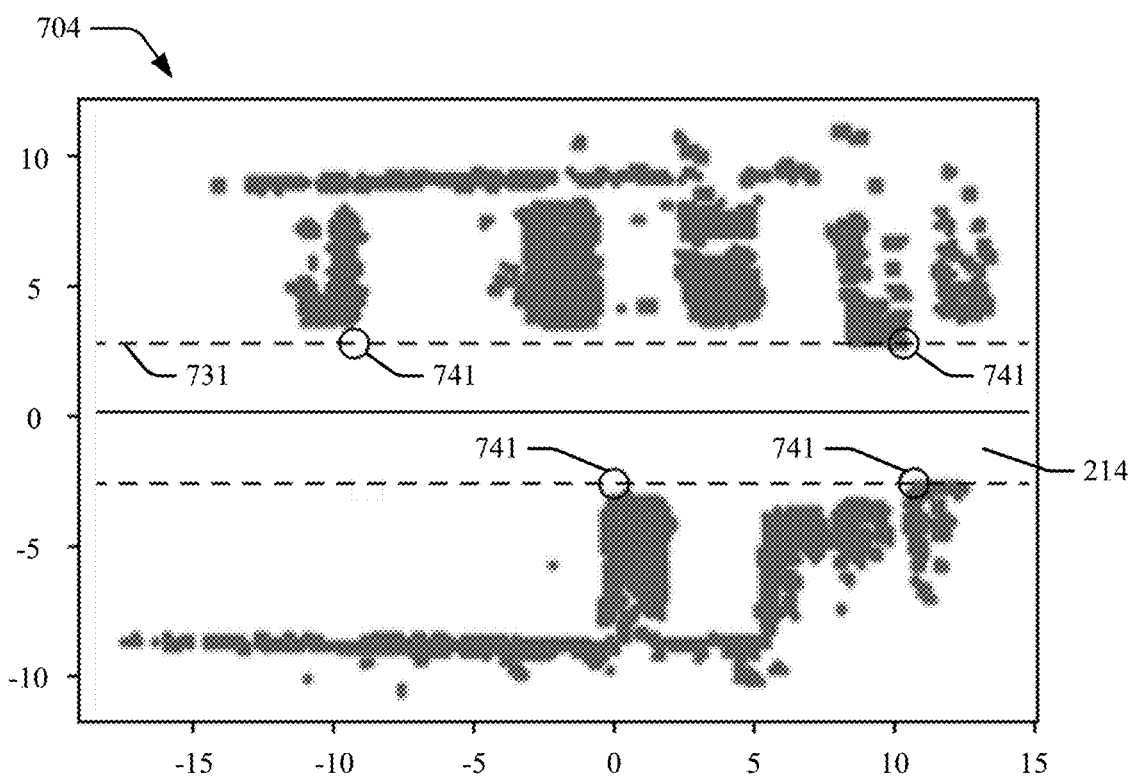
Figures 5, 7:
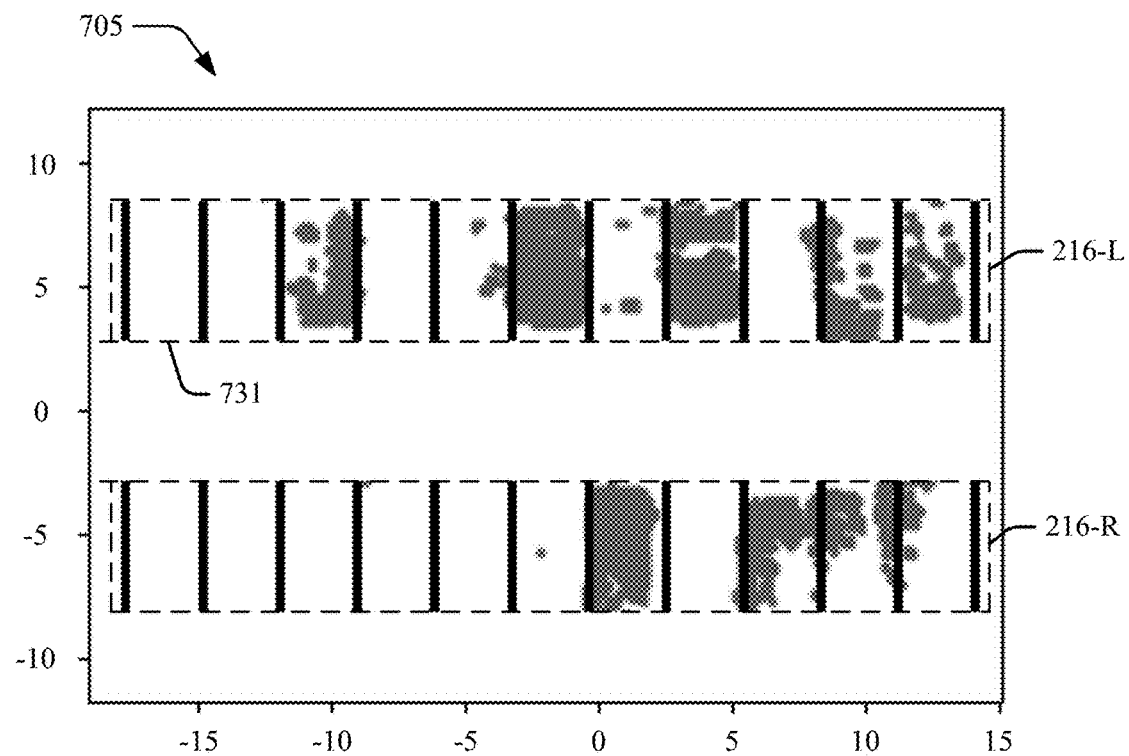
Figures 6, 7:
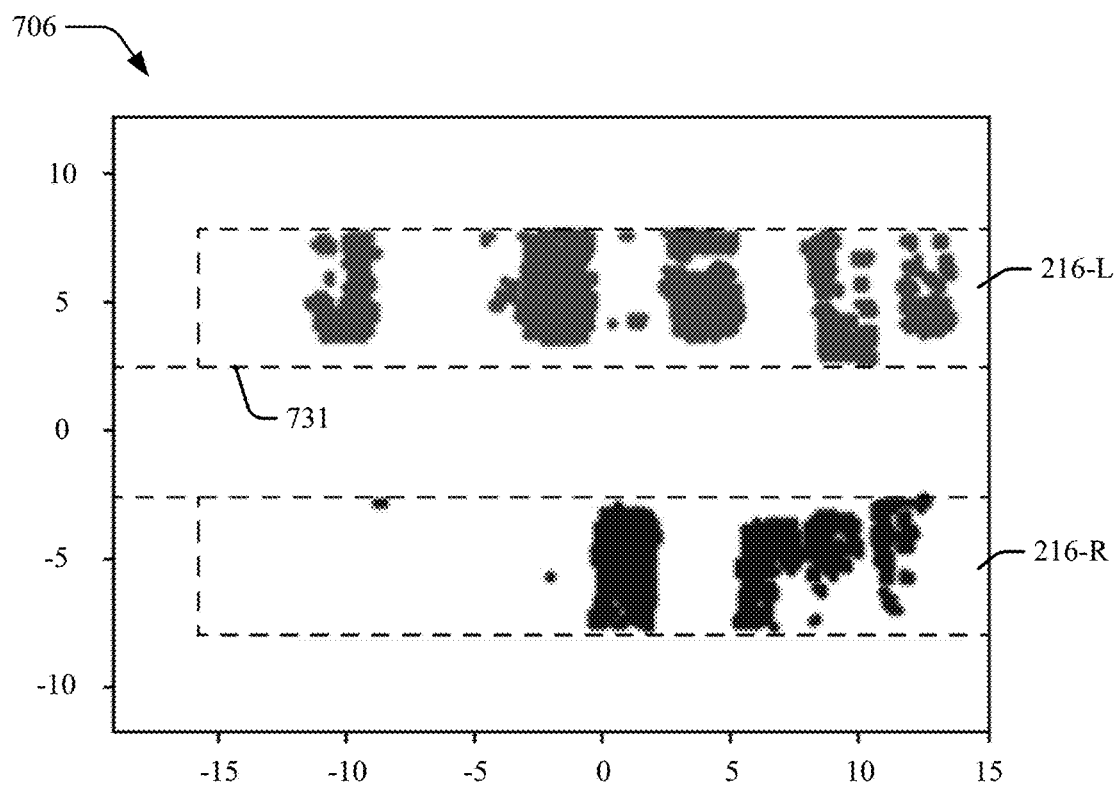
Figure 7:
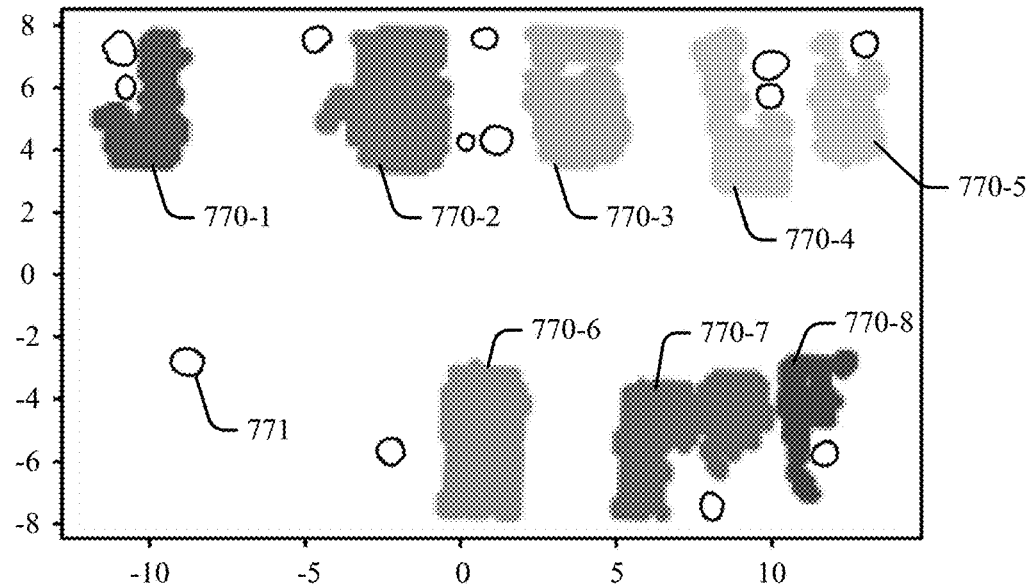
Figures 7, 8:
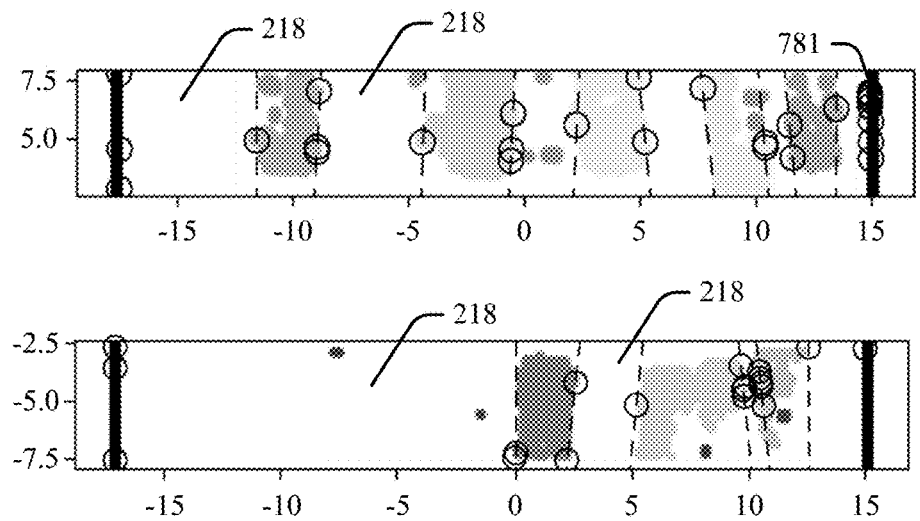
Figure 8:
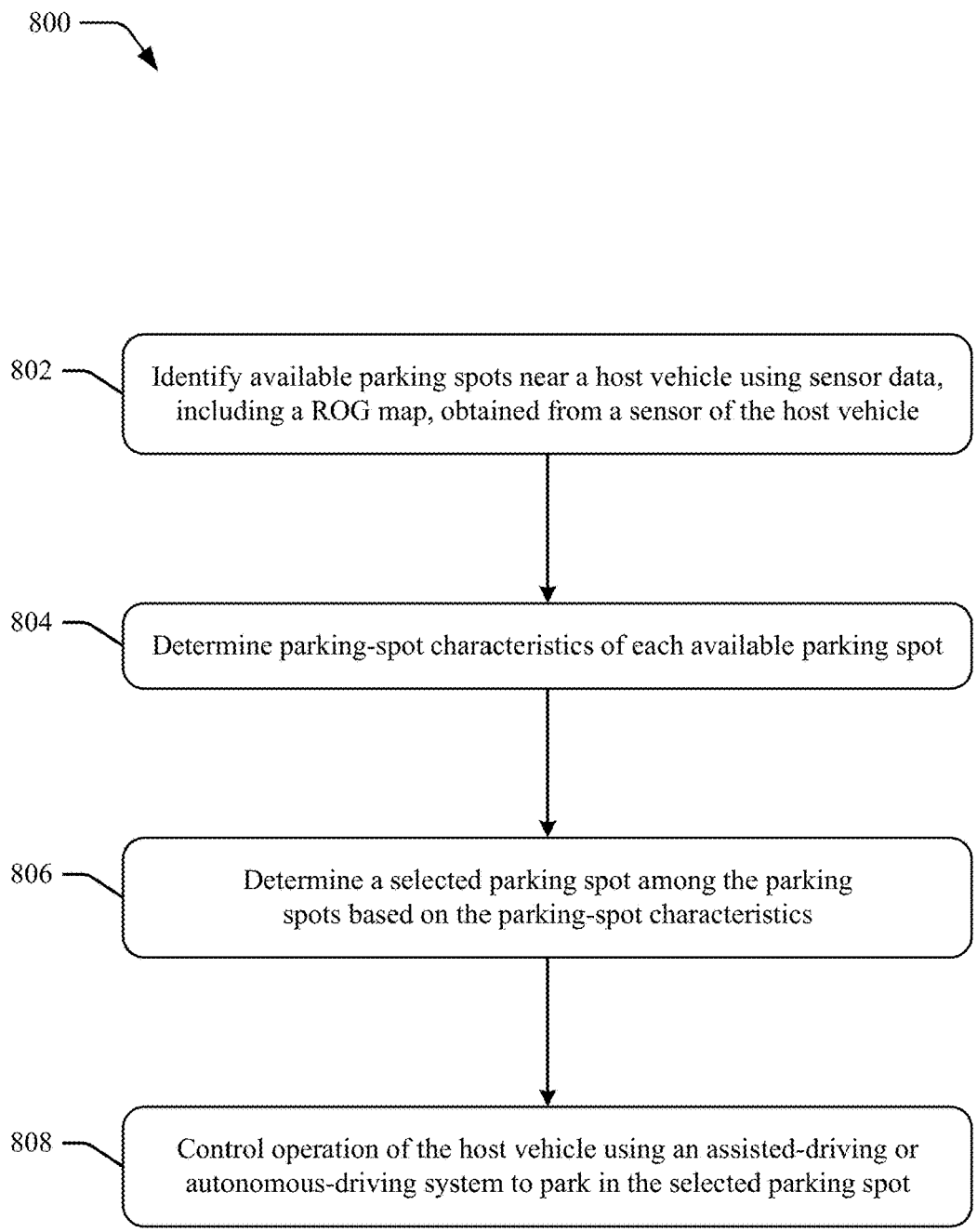

FIG. 6 illustrates an example flowchart 600 of the described techniques and systems to identify parking spots using a RCOG map. Flowchart 600 is shown as operations (or acts) performed, but not necessarily limited to the order or combinations in which the operations are shown herein. FIGS. 7-1 through 7-8 illustrate example ROG and RCOG maps used by the described techniques and systems to find parking spots. Further, any one of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities.

At step 604, the parking spot finder 114 obtains inputs 602 and performs raw data preprocessing on the ROG map 504. The inputs 602 includes the ROG map 504, but may also include the vehicle state estimates 502, the vision line detections 506, or the map data 508. An example of the ROG map 504 is illustrated in FIG. 7-1 as ROG map 701. The ROG map 701 represents the parking environment around the vehicle 102. The black cells in the ROG map 701 represent spatial cells of the parking environment 100 in which the probability that the corresponding portion of space is occupied is above a particular value (e.g., 0.5).

The parking spot finder 114 may filter the ROG map 701 using a probability threshold (e.g., a value of 0.65) for each cell. The probability threshold is generally dependent on the type or model of the radar system 402, but is generally set to a value equal to or greater than 0.5. Cells that have a probability value lower than the probability threshold are filtered from the ROG map 701. In some implementations, the parking spot finder 114 may obtain a ROG map that has already been filtered using the probability threshold by the radar system 402 or another component.

The parking spot finder 114 may also rotate the ROG map 701 according to the heading of the vehicle 102 (e.g., so it aligns with its heading), which may result in rotating the ROG map 701 as illustrated by the RCOG map 702 of FIG. 7-2. If the vehicle state estimates 502, vision line detections 506, and/or map data 508 are obtained, the parking spot finder 114 may also align the coordinates of these inputs 602 and convert them to a vehicle coordinate system. For the RCOG map 702, the parking spot finder 114 has converted the ROG map 701 into the vehicle coordinate system with an x-axis 721 aligned along the heading of the vehicle 102 and having a zero value at its current position. A y-axis 722 of the RCOG map 702 also has its zero value at the current position of the vehicle 102. The parking spot finder 114 may also overlay the vision line detections 506 onto the RCOG map 702, as illustrated in FIG. 7-2. Although the RCOG map 702 includes vision line detections 506 and other non-radar data, it remains radar-centric. As described with respect to steps 606 through 614, a ROG or RCOG map may be used by the parking spot finder 114 to identify available spots 108. In the illustrated example, the vision line detections 506 include parking-spot lines 723, handicap-spot markings 724, a barrier 725 (e.g., shopping cart return area), and curbs 726. In other implementations where the parking-spot lines 723 are available, the parking spot finder 114 may be able to identify the available spots 108 directly from the RCOG map 702.

At step 606, the parking spot finder 114 detects the drivable aisle 214 for the parking environment 100. In particular, the parking spot finder 114 determines aisle boundaries associated with the drivable aisle 214, determines the aisle width 220 and heading of the drivable aisle 214, and divides the RCOG map into the left and right segments. As illustrated in FIG. 7-3, the drivable aisle 214 is detected in the RCOG map 703 using the parking-spot lines 723. In particular, the ends of the parking-spot lines 723 are used to define the aisle boundaries 731. If parking-spot lines 723 are not available (or of insufficient quality) as illustrated in FIG. 7-4, the parking spot finder 114 uses support vector machines (SVMs) to analyze the occupied cells in the RCOG map 704 and identify hyperplanes 741 that define the aisle boundaries 731. The parking spot finder 114 may also filter out occupied cells within the drivable aisle 214.

At step 608, the parking spot finder 114 divides the RCOG map into ROI segments 216 and determines a segment depth associated with each ROI segment 216. In particular, the left ROI segment 216-L and the right ROI segment 216-R are determined. In some implementations, if parking is only available on one side of the drivable aisle 214, a single ROI segment 216 is identified. As illustrated in FIG. 7-5, the left ROI segment 216-L and the right ROI segment 216-R are determined in the RCOG map 705 using the parking-spot lines 723 and extend from the aisle boundaries 731. The segment depth can be determined based on a length of one or more parking-spot lines 723.

If the parking-spot lines 723 are not available as illustrated in FIG. 7-6, the parking spot finder 114 uses the aisle boundaries 731 and a segment depth to identify the ROI segments 216 in the RCOG map 706. The segment depth may be determined using a baseline or predetermined depth and the angle of the parked vehicles. The baseline depth is, for example, an average or maximum car length (e.g., 4.5 to 5 meters) for parking spots perpendicular to (e.g., 90-degree angle) the drivable aisle 214. For parallel-parking spots (e.g., 0-degree or 180-degree angle), the segment depth is an average or maximum car width. The angle of the parked vehicles can be determined from either radar tracker data or principal component analysis of clusters in the RCOG map 706. In some implementations, the segment depth and parking-spot angle can be obtained from the map data 508.

At step 610, the parking spot finder 114 performs clustering on the RCOG map within the ROI segments 216 to separate the parked vehicles from one another. The parking spot finder 114 may also identify noise. The clustering can be performed using Density-Based Spatial Clustering of Applications with Noise (DBSCAN) techniques. Other clustering techniques may be used, including, for example, k-means clustering or mean shift clustering. In FIG. 7-7, the parking spot finder 114 uses a DBSCAN technique to identify eight clusters 770 (e.g., a first cluster 770-1, a second cluster 770-2, a third cluster 770-3, a fourth cluster 770-4, a fifth cluster 770-5, a sixth cluster 770-6, a seventh cluster 770-7, and an eighth cluster 770-8) and noise 771.

At step 612, the parking spot finder 114 detects the open spaces 218 within the ROI segments 216. As described above, the open spaces 218 represent unoccupied areas between the clusters 770 within each ROI segment 216. An open space 218 may include one or more available spots 108 or be too small to include an available spot 108. As illustrated with the RCOG map 708 in FIG. 7-8, the parking spot finder 114 adds padding clusters 781 at the longitudinal ends of each ROI segment. The padding clusters 781 can represent the end of the parking-spot lines 723 or an effective range of the radar system 402 or the RCOG map 708. The parking spot finder 114 can use SVMs to identify the longitudinal sides of each open space 218. If the parking-spot angle is known or determined from the clusters 770, the parking spot finder 114 can identify the open spaces 218 using a specified-angle mode (e.g., for 90-degree angles, find the largest rectangle that fits between adjacent clusters 770).

At step 614, the parking spot finder 114 detects the available spots 108 within each open space 218. The parking spot finder 114 may add bounding boxes for each available spot 108 within the open spaces 218. The parking spot finder 114 can use the parking-spot lines 723 to place the bounding boxes inside each detected open space 218. If the parking-spot lines 723 are not available or of low quality, the bounding boxes are added to the RCOG map using a predetermined spot width and depth. For open spaces 218 in front of the vehicle 102, the parking spot finder 114 may start the bounding boxes at the lateral end of the open space 218 nearest the vehicle 102 (e.g., left-most edge). For open spaces 218 to the side or behind the vehicle 102, the parking spot finder 114 may start the bounding boxes at the lateral end of the open space 218 nearest the vehicle 102 (e.g., right-most edge). In other implementations, the parking spot finder 114 may center the maximum number of bounding boxes within each open space 218.

The parking spot finder 114 then outputs the parking-spot characteristics 510 for each available spot 108, which are represented by the bounding boxes in the RCOG map. As described above, the parking-spot characteristics 510 include which side of the vehicle the available spot 108 is located on (e.g., left or right), VCS or UTM coordinates for the four corners of the bounding box for the available spot 108, VCS or UTM angle for the available spot 108 relative to a drivable aisle 214, VCS or UTM coordinates for the front center portion of the bounding box for the available spot 108, a width 202, a spot depth (e.g., a longitudinal depth of each available spot 108), entry turning radius 204 (e.g., this may be derived from other measured parking-spot characteristics 510), longitudinal distance 206 to the available spot 108, spot type (e.g., handicapped, compact car, reserved, electric-vehicle only, autonomous-only), neighboring vehicle classification, shading classification, and spot classification.

The parking spot finder 114 may also output open-space characteristics for each open space 218 within the ROI segments 216. The open-space characteristics may include a space width, UTM angle in radians or degrees, VCS angle relative to the drivable aisle 214 in radians or degrees, VCS or UTM coordinates of the four corners, and/or VCS or UTM coordinates for one or more centers of the open space 218. The parking system 112 can also identify whether a particular open space 218 is next to or includes an end of a ROI segment 216.

FIG. 8 illustrates an example method 800 of a parking system to identify and select a parking spot using a RCOG map. Method 800 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to the environment 100 of FIG. 1, and entities detailed in FIGS. 1 through 6, reference to which is made for example only. The techniques are not limited to performance by one entity or multiple entities.

At step 802, parking spots available near a host vehicle are identified using sensor data obtained from sensors of the host vehicle. The sensors include one or more radar systems and the sensor data includes a ROG map. For example, the parking system 112 or the parking spot finder 114 identifies available spots 108 near the vehicle 102 among the parking spots 104 within the environment 100. The available spots 108 can be found using sensor data obtained from the sensors 110. The sensors 110 can include the radar system 402, the camera system 404, lidar systems, or ultrasonic systems. The sensor data can include the vehicle state estimates 502, the ROG map 504, the vision line detections 506, and the map data 508. In other implementations, the available spots 108 can also be identified based on data obtained from external sensors, including infrastructure sensors, drone-based sensors, or sensors installed on the other vehicles 106 near the vehicle 102 or within the environment 100.

The parking spots 104 can be approximately perpendicular to or at an angle to a travel path of the vehicle 102. In other environments, the parking spots 104 can be approximately parallel to the travel path of the vehicle 102.

The parking spot finder 114 can preprocess the ROG map 504 by rotating and aligning the ROG map 504 to a vehicle coordinate system, applying a probability threshold to filter out one or more cells of the ROG map 504; and/or supplementing the ROG map 504 with the vision line detections 506 to generate the RCOG map 702 for the parking environment. As described above, the vision line detections 506 may include parking-spot lines 723 for the one or more parking spots in the parking environment.

The parking spot finder 114 can identify the available spots 108 by detecting, using the vision line detections 506 or SVMs, a drivable aisle 214 within the ROG map 504 for the parking environment and identifying one or more ROI segments 216 to a lateral side of the drivable aisle 214 within the ROG map 504. The drivable aisle 214 may be determined by identifying, using the parking-spot lines 723 or a support-vector-machines (SVMs) analysis of the ROG map 504, aisle boundaries 731 of the drivable aisle 214 and determining an aisle width and a heading of the drivable aisle 214.

For each ROI segment 216, the parking spot finder 114 identifies clusters 770 among occupied cells of the ROG map 504, with the clusters 770 representing stationary objects in a subset of the one or more parking spots. The parking spot finder 114 then determines open spaces 218 between or adjacent to the clusters 770. The open spaces 218 represent unoccupied portions of each ROI segment 216 and may be wider or narrower than a single parking spot. The open spaces 218 may be identified by adding padding clusters 781 at longitudinal ends of the ROI segment 216 and identifying the open spaces 218 between the padding clusters 781 and the clusters 770. The padding clusters 781 represent an end of the parking-spot lines 723 within the ROI segment 216 or an effective range of the radar system 402 or the camera system 404. Longitudinal sides of the open spaces 218 are determined using support vectors of a SVM analysis of the clusters 770 or angled vectors with a predetermined angle. The parking spot finder 114 then divides the open spaces into the one or more available spots 108 by using the parking-spot lines 723 to arrange bounding boxes for the available spots 108 or using a predetermined spot width and spot depth to arrange bounding boxes for the available spots 108.

At step 804, parking-spot characteristics of each available parking spot are determined. For example, the parking system 112 or the parking spot finder 114 can use the sensor data to determine the parking-spot characteristics 510 of each available spot 108.

At step 806, a selected parking spot is determined among the parking spots based on the parking-spot characteristics. For example, the parking system 112 or the parking spot selector 116 can determine the selected spot 512 among the available spots 108 based on the parking-spot characteristics 510. As described in greater detail with respect to FIG. 9, the selected spot 512 can be determined using conditional probability distributions for the parking-spot characteristics 510 and an application of the Bayesian theorem to the conditional probability distributions for the parking-spot characteristics 510. The selected spot 512 can also be determined using a machine-learned model, a reinforced learning model, or a deep learning model.

At step 808, the operation of the host vehicle is controlled using an assisted-driving or autonomous-driving system to park in the selected spot. For example, the parking system 112 or the parking planner 118 can control operation of the vehicle 102 to park in the selected spot 512. The vehicle 102 can be controlled using the assisted-driving system 314 or the autonomous-driving system 316. The vehicle 102 can park via a front-in parking maneuver. Alternatively, the vehicle 102 can park in the selected spot 512 by performing a back-in parking maneuver.

Figure 9:
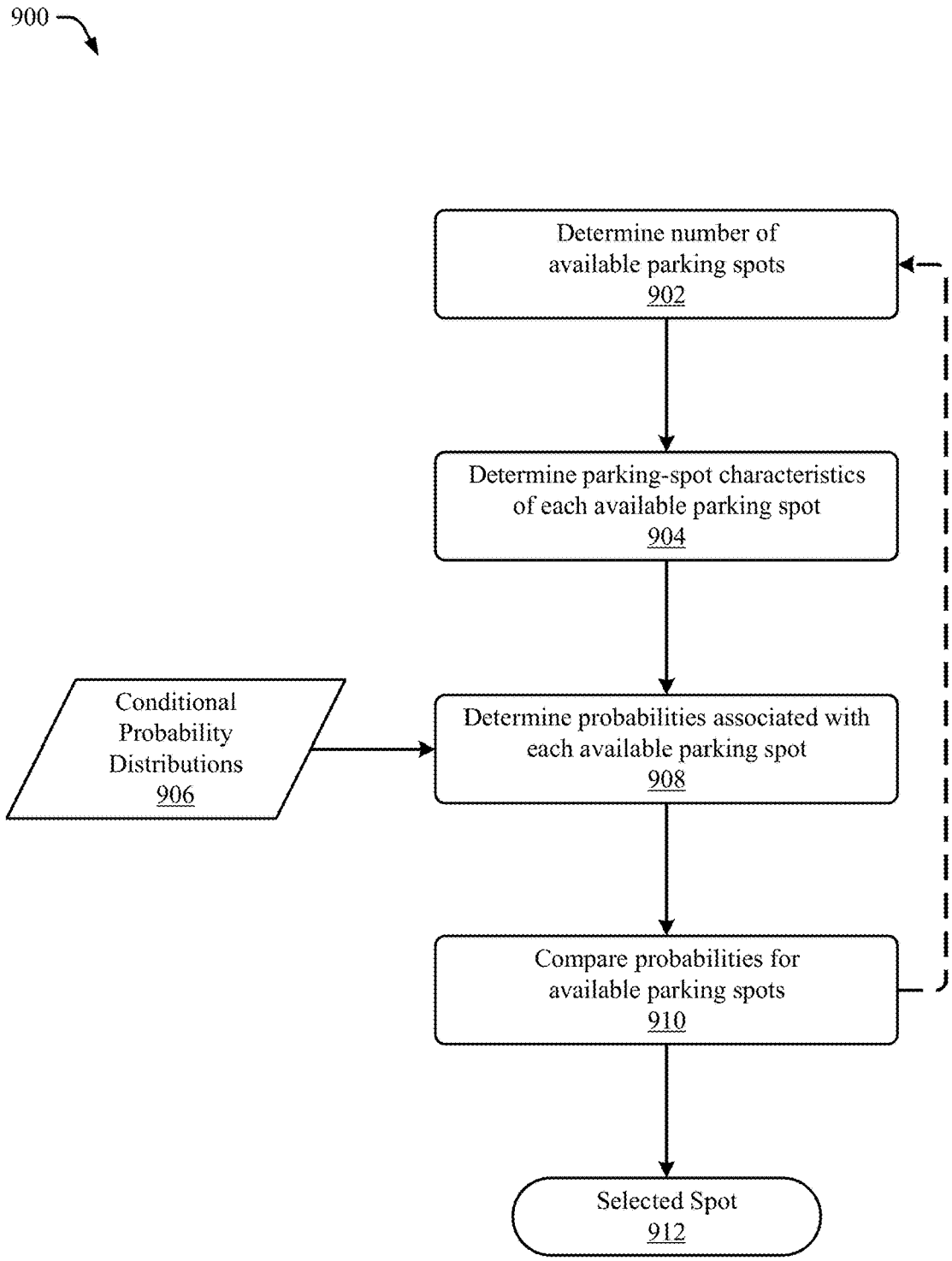
FIG. 9 illustrates an example flowchart of the described techniques and systems to select a parking spot using a probabilistic approach.

FIG. 9 illustrates an example flowchart 900 of the described techniques and systems to select a parking spot using a probabilistic approach. The parking system of FIG. 9 can, for example, be the parking system 112 and/or the parking spot selector 116 of FIGS. 1 and 3. The output of the flowchart 900 is a selected spot 912. The selected spot 912 can be displayed to the driver of vehicle 102 and/or provided as an input to the parking system 112 and/or the parking planner 118 to determine a parking maneuver.

At step 902, the parking system 112 can determine the number of available spots 108 in front of the vehicle 102 along its current travel path. The number, n, of available spots 108 can be identified using sensor data from the sensors 110, including the ROG map 504. As described above, the sensors 110 can include radar systems, lidar systems, ultrasonic systems, vision-based systems, or other types of sensor systems.

At step 904, the parking system 112 can determine the parking-spot characteristics 510 associated with each available spot 108. The parking-spot characteristics 510 can be determined using the sensor data from the sensors 110 or data from external sensors. The parking-spot characteristics 510 include the width 202 (W), entry turning radius 204 (TR), and longitudinal distance 206 (Dis) to the available spot 108. In other implementations, the parking system 112 can determine and utilize other parking-spot characteristics 510 (e.g., spot depth, spot type, neighboring vehicle classification, or shading classification).

The parking system 112 can store conditional probability distributions 906 associated with the parking-spot characteristics 510 in the CRM 306. The conditional probability distributions 906 identify how probable an available spot 108 is likely to be chosen as the selected spot 912 (Sel) given its parking-spot characteristics 510. For example, the width 202 can have a conditional probability distribution (e.g., P(W|Sel)) with a mean of 4.7 and a variance of 1.0. The entry turning radius 204 can have a conditional probability distribution (e.g., P(TR|W, Dis, Sel)) with a mean of 5.0 and a variance of 1.0. As described above, the entry turning radius 204 can be dependent on the width 202 and the longitudinal distance 206. The longitudinal distance 206 can have a conditional probability distribution (e.g., P(Dis|Sel)) with a mean of 6.0 and a variance of 5.0. If additional parking-spot characteristics 510 are used to determine the selected spot 912, the parking system 112 can store conditional probability distributions 906 associated with those characteristics. In addition, user preferences can also be incorporated into the parking system 112 by adjusting the conditional probability distributions 906 accordingly.

At step 908, the parking system 112 can determine probabilities associated with each available spot 108 using the parking-spot characteristics 510 and the conditional probability distributions 906. The parking system 112 can determine the probability of a particular available spot 108 being the selected spot 912 (Sel) using an application of the Bayesian theorem. Given the width 202 (W), entry turning radius 204 (TR), and longitudinal distance 206 (Dis), the probability of a particular available spot 108 (e.g., the ith available space) being the selected spot 912 among n number of available spot 108 is represented by Equation (1):

$$P(Sel \mid W, TR, Dis) = \frac{P(W, TR, Dis \mid Sel)P(Sel)}{\sum_{i=1}^{n} [P(W, TR, Dis \mid Sel)P(Sel)]} \quad \text{Equation (1)}$$

Based on the conditional probability distributions 906 for the width 202 (W), entry turning radius 204 (TR), and longitudinal distance 206 (Dis), Equation (1) can be rewritten as Equation (2):

$$P(Sel \mid W, TR, Dis) = \frac{P(W \mid Sel)P(TR \mid W, Dis, Sel)P(Dis \mid Sel)P(Sel)}{\sum_{i=1}^{n} [P(W \mid Sel)P(TR \mid W, Dis, Sel)P(Dis \mid Sel)P(Sel)]} \quad \text{Equation (2)}$$

In some implementations, the parking system 112 can place an upper limit on the conditional probability of a particular parking-spot characteristic 512. For example, if the width 202 (e.g., W(i)) of a particular available spot 108 is greater than the mean of its associated conditional probability distribution, then the width 202 can be set as equal to the mean. Similarly, if the entry turning radius 204 (e.g., TR(i)) of a particular available spot 108 is greater than the mean of its associated conditional probability distribution, then the entry turning radius can be set as equal to the mean.

At step 910, the parking system 112 can compare probabilities for the available spots 108 and select the available spot 108 with the highest probability as the selected spot 912. The parking system 112 can use a probability threshold (e.g., 0.5) as a lower minimum for the selected spot 912. In other implementations, the selected spot 912 can be the nearest available spot 108 that has a probability value above the probability threshold. If the parking system 112 does not identify a selected spot 912, the parking system 112 can cause the vehicle 102 to continue forward in the environment 100 (e.g., down the current parking row or into an adjacent parking row) until a selected spot 912 is identified. An example implementation of the flowchart 900 is described with respect to FIGS. 10-1 through 10-3.

Figures 1, 10:
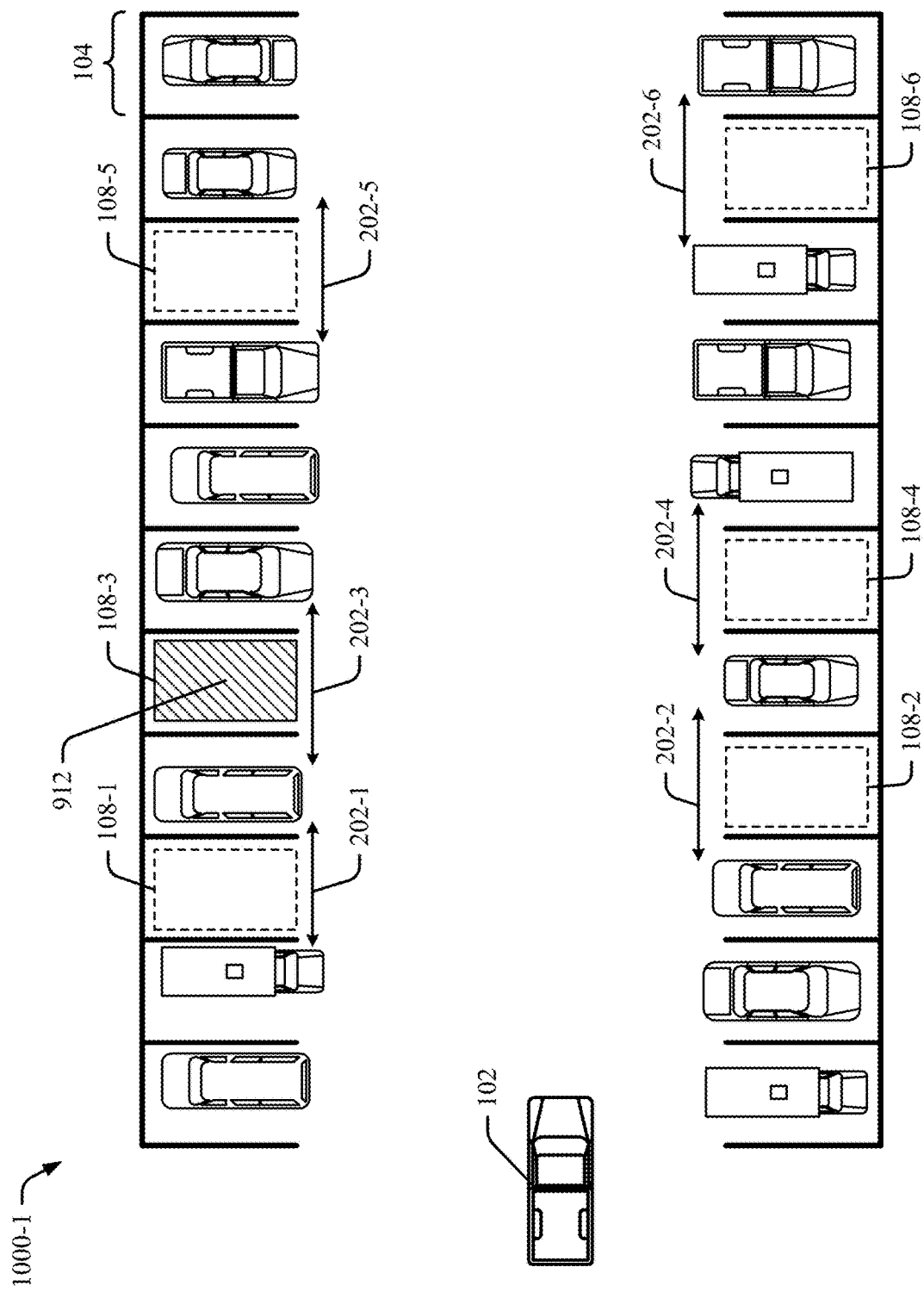
Figures 2, 10:
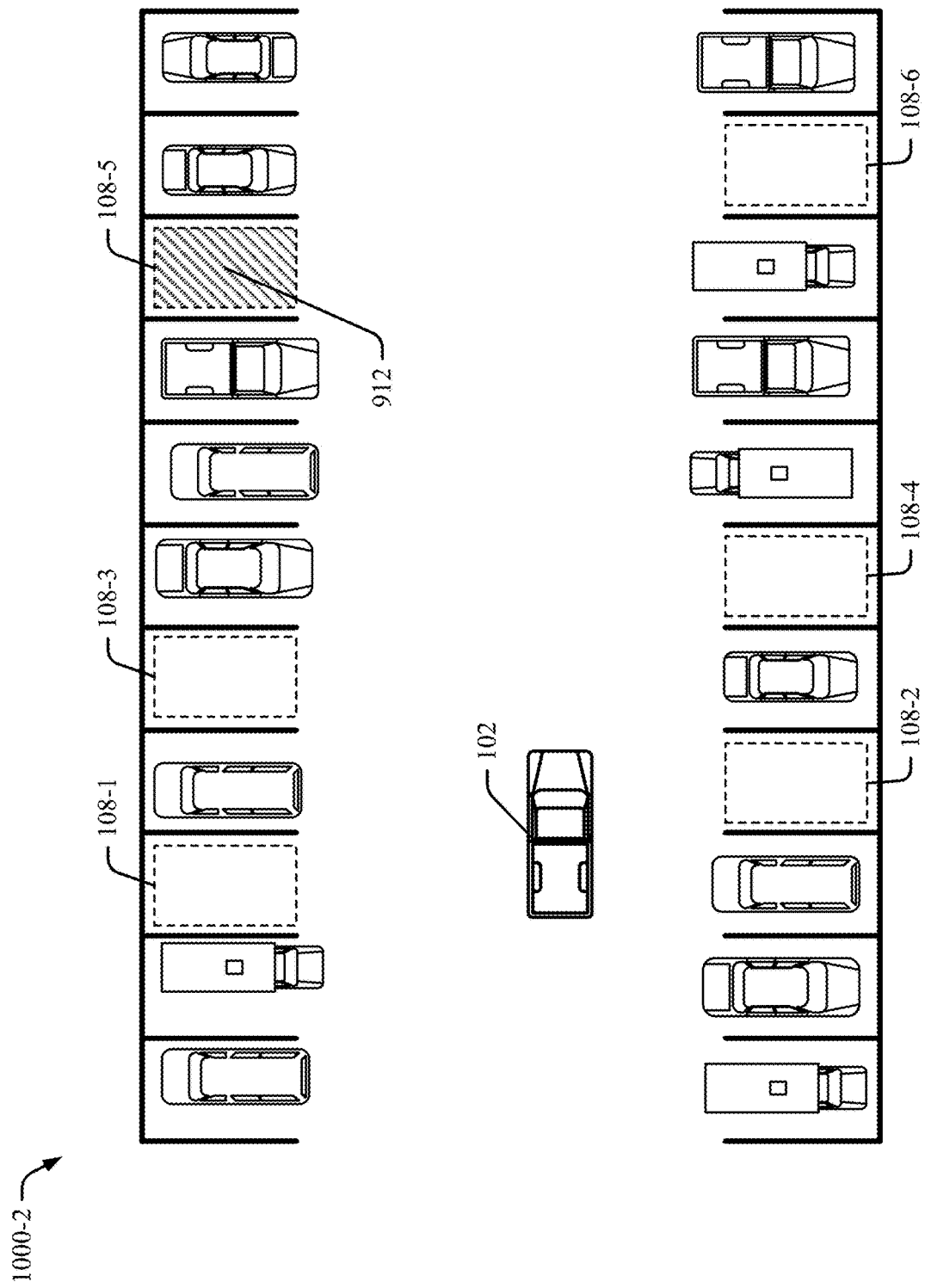
Figures 3, 10:
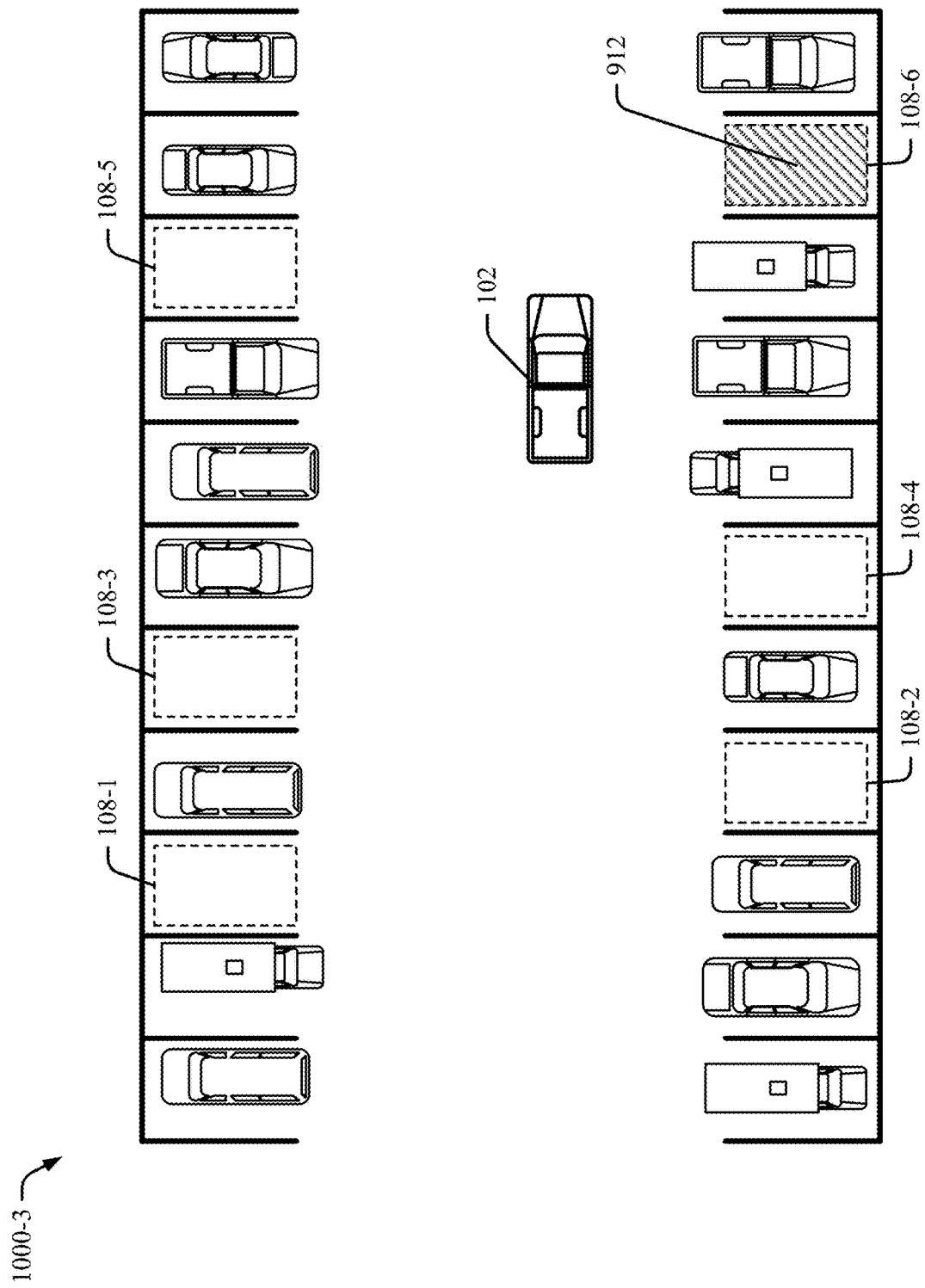

FIG. 10-1 through 10-3 illustrate example selections of a parking spot using a probabilistic approach in accordance with techniques of this disclosure. In the illustrated environments 1000-1 through 1000-3, a vehicle (e.g., the vehicle 102) is in a parking environment (e.g., a parking lot at a grocery store) with several available spots 108. In particular, the environments 1000-1 through 1000-3 include six available parking spots 108, which in this example are designated as: available spot 108-1, available spot 108-2, available spot 108-3, available spot 108-4, available spot 108-5, and available spot 108-6.

In FIG. 10-1, six available spots 108 are potential parking spots. The vehicle 102 can use the parking system 112 or the parking spot finder 114 to identify the available spots 108 and the parking spot selector 116 to determine the selected spot 912. For example, the selected spot 912 can be identified using the techniques and systems described with respect to FIGS. 7 and 8. In the depicted implementation, the selected spot 912 is determined based on the width 202 (e.g., the width 202-1 for the available spot 108-1), the entry turning radius 204, and the longitudinal distance 206 associated with each available spot 108. In the depicted environment 1000-1, the available spots 108 each have a respective width 202, a respective entry turning radii 204, and a respective longitudinal distance 206, as listed in Table 1:

TABLE 1

| SPOT | WIDTH 202 | ENTRY TURNING RADIUS 204 | LONGITUDINAL DISTANCE 206 |
| --- | --- | --- | --- |
| 108-1 | 3 m | 5.0 m | 2 m |
| 108-2 | 4 m | 3.5 m | 4 m |
| 108-3 | 5 m | 5.0 m | 6 m |
| 108-4 | 4 m | 3.5 m | 8 m |
| 108-5 | 4 m | 5.0 m | 15 m |
| 108-6 | 4 m | 3.5 m | 17 m |

The parking system 112 can determine the widths 202 as the distance between the other vehicles 106 in adjacent parking spots based on sensor data from the sensors 110. In the environment 1000-1, the available spot 108-1 has the smallest width 202-1 at 3 meters and the available spot 108-3 has the largest width 202-3 at 5 meters.

The parking system 112 can determine the entry turning radii 204 as the turning radius necessary to enter the available spot 108. In this example, the entry turning radius 204 is determined based on the lateral distance to the available spot 108 as determined from the sensor data. For example, the available spots 108-1, 108-3, and 108-5 to the left of the vehicle 102 have an entry turning radius of 5 meters each; in contrast, the available spots 108-1, 108-3, and 108-5 have an entry turning radius of 3.5 meters each.

The parking system 112 can determine the longitudinal distances as the distance to the available spot 108 based on sensor data from the sensors 110. In this example, the available spots 108-1, 108-2, 108-3, 108-4, 108-5, and 108-6 have a longitudinal distance of 2 meters, 4 meters, 6 meters, 8 meters, 15 meters, and 17 meters, respectively.

Based on the parking-spot characteristics 510, the parking system 112 determines a probability of being the selected spot 912 of 0.277, 0.108, 0.614, 0.001, 0, and 0 for the available spots 108-1, 108-2, 108-3, 108-4, 108-5, and 108-6, respectively. As a result, the parking system 112 identifies the available spot 108-3 as the selected spot 912.

In this implementation, the selection threshold can be set at 0.5 and the parking system 112 can cause the assisted-driving system 314 or the autonomous-driving system 316 to park in the selected spot 912. Alternatively, the parking system 112 can provide the driver of the vehicle 102 an option to override or veto the selected spot 912 and continue along the environment 1000-1 until another selected spot 912 is identified. The driver can, for example, veto the selected spot 912 based on personal preferences. If none of the available spots 108 satisfy the selection threshold, the parking system 112 can continue along the environment 1000-1 until an available spot 108 satisfies the selection threshold.

In FIG. 10-2, three available spots 108 (e.g., available spots 108-4, 108-5, and 108-6) are potential parking spots 104 for the vehicle 102. The vehicle 102 has either passed the other available spots (e.g., available spots 108-1 and 108-2) or the longitudinal distance is smaller than the minimum inner turning radius of the vehicle, which is true for the available spot 108-3.

The vehicle 102 can use the parking system 112 to identify the selected spot 912 in the environment 1000-2. In particular, the parking system 112 can update the probabilities associated with the available spots 108 being the selected spot 912. In the environment 1000-2, the parking system 112 determines a probability of being the selected spot 912 of 0.215, 0.686, and 0.099 for the available spots 108-4, 108-5, and 108-6, respectively. As a result, the parking system 112 identifies the available spot 108-5 as the selected spot 912 for the environment 1000-2.

The parking system 112 can use error codes or similar techniques to exclude available spots 108. The error codes can include, for example, the space width is too small, the entry turning radius is too small, or the longitudinal distance is too small or has a negative value. The error codes can allow the parking system 112 to filter available spots 108 as the vehicle 102 travels through the parking environment 1000-2. In this way, the parking system 112 can efficiently determine probabilities associated with the available spots 108 that satisfy the filters.

In the environment 1000-3 of FIG. 10-3, a single available spot 108 (e.g., the available spot 108-6) is a potential parking spot for the vehicle 102. The vehicle 102 has either passed the other available spots (e.g., available spots 108-1, 108-2, 108-3, and 108-4) or the longitudinal distance is smaller than the minimum inner turning radius of the vehicle 102, which is true for the available spot 108-5.

The vehicle 102 can use the parking system 112 to identify the selected spot 912 in the environment 1000-3. In particular, the parking system 112 can update the probabilities associated with the available spots 108 being the selected spot 912. The parking system 112 determines a probability of being the selected spot 912 of 1.0 for the available spot 108-6. As a result, the parking system 112 identifies the available spot 108-6 as the selected spot 912 for the environment 1000-3.

EXAMPLES

In the following section, examples are provided.

Example 1. A method comprising: identifying, using sensor data obtained from one or more sensors of a host vehicle, one or more available parking spots near the host vehicle in a parking environment, the one or more sensors including a radar system and the sensor data including a radar occupancy grid (ROG) map; determining, using the sensor data, parking-spot characteristics of each available parking spot of the one or more available parking spots; determining a selected parking spot among the one or more available parking spots based on the parking-spot characteristics; and controlling, using an assisted-driving or autonomous-driving system and based on the parking-spot characteristics, operation of the host vehicle to park in the selected parking spot.

Example 2. The method of Example 1, wherein identifying the one or more available parking spots near the host vehicle in the parking environment comprises: detecting, using the sensor data, a drivable aisle within the ROG map for the parking environment; identifying one or more regions-of-interest (ROI) segments to a lateral side of the drivable aisle within the ROG map, the one or more ROI segments comprising one or more parking spots in the parking environment; for each ROI segment of the one or more ROI segments, identifying clusters among occupied cells of the ROG map, the clusters representing stationary objects in a subset of the one or more parking spots; for each ROI segment, determining open spaces between or adjacent to the clusters, the open spaces representing unoccupied portions of each ROI segment and being wider or narrower than a single parking spot; and dividing the open spaces into the one or more available parking spots.

Example 3. The method of Example 2, wherein identifying the one or more available parking spots near the host vehicle in the parking environment further comprises at least one of: rotating and aligning the ROG map to a vehicle coordinate system; applying a probability threshold to filter out one or more cells of the ROG map; or supplementing the ROG map with vision line detections from a camera system to generate a radar-centric occupancy grid (RCOG) map for the parking environment, the vision line detections including parking-spot lines, handicap-spot markings, barriers, or curbs for the one or more parking spots in the parking environment.

Example 4. The method of Example 3, wherein detecting the drivable aisle within the ROG map for the parking environment comprises: identifying, using the parking-spot lines or a support-vector-machines (SVMs) analysis of the ROG map, aisle boundaries of the drivable aisle; and determining an aisle width and a heading of the drivable aisle.

Example 5. The method of Example 4, wherein a segment depth of the one or more ROI segments can be determined using the parking-spot lines or an angle of the clusters within the ROI segments, the segment depth being perpendicular to the aisle boundaries.

Example 6. The method of any one of Examples 3 through 5, wherein, for each ROI segment, determining the open spaces between or adjacent to the clusters comprises: adding padding clusters at longitudinal ends of the ROI segment, the padding clusters representing an end of the parking-spot lines within the ROI segment or an effective range of the radar system or the camera system; and identifying the open spaces between the padding clusters and the clusters.

Example 7. The method of Example 6, wherein longitudinal sides of the open spaces are determined using support vectors of a support-vector-machines (SVMs) analysis of the clusters or angled vectors with a predetermined angle.

Example 8. The method of any one of Examples 3 through 7, wherein dividing the open spaces into the one or more available parking spots comprises: using the parking-spot lines to arrange bounding boxes for the one or more available parking spots inside the open spaces; or using a predetermined spot width and spot depth to arrange bounding boxes for the one or more available parking spots inside the open spaces.

Example 9. The method of any one of the previous Examples, wherein the parking-spot characteristics comprise at least two of: a width associated with each available parking spot; an entry turning radius to each available parking spot; a longitudinal distance to each available parking spot; an identification to which side of the host vehicle each available parking spot is located; positional coordinates for each available parking spot; a depth of each available parking spot; a spot type of each available parking spot; or an angle of each available parking spot.

Example 10. The method of any one of the previous Examples, wherein the selected parking spot is determined using conditional probability distributions for the parking-spot characteristics.

Example 11. The method of any one of the previous Examples, wherein: the parking environment comprises a parking lot, a parking structure, on-street parking spots, or a parking garage; and controlling operating of the host vehicle to park in the selected parking spot comprises performing a front-in parking maneuver or a back-in parking maneuver.

Example 12. A system comprising one or more sensors and one or more processors configured to perform the method of any one of Examples 1 through 11.

Example 13. The system of Example 12, wherein the one or more sensors include a radar system that has a field of view in an elevation dimension that allows for detections of EM signals reflected by the roadway, the elevation dimension being orthogonal to a roadway of the parking environment.

Example 14. The system of Example 12 or 13, wherein: the one or more sensors further includes a camera system; and the sensor data further includes vision line detections from the camera system.

Example 15. A computer-readable storage media comprising computer-executable instructions that, when executed, cause a processor to perform the method of any one of Examples 1 through 11.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method comprising:
identifying, using a radar-occupancy-grid (ROG) map generated based on sensor data obtained from one or more sensors of a host vehicle, a plurality of available parking spots near the host vehicle in a parking environment, the one or more sensors including radar sensors;
determining, using the sensor data, parking-spot characteristics of each available parking spot of the plurality of available parking spots;
determining a selected parking spot among the plurality of available parking spots based on the parking-spot characteristics, wherein the selected parking spot is determined using conditional probability distributions for the parking-spot characteristics, and wherein the conditional probability distributions identify how probable each of the plurality of available parking spots is likely to be the selected parking spot given the corresponding parking-spot characteristics of that available parking spot; and
controlling, based on the parking-spot characteristics, operation of the host vehicle to autonomously park in the selected parking spot.

2. The method of claim 1, wherein identifying the plurality of available parking spots near the host vehicle in the parking environment comprises:
detecting, using the sensor data, a drivable aisle within the ROG map for the parking environment;
identifying one or more regions-of-interest (ROI) segments to a lateral side of the drivable aisle within the ROG map, the one or more ROI segments comprising one or more parking spots in the parking environment including the plurality of available parking spots;
for each ROI segment of the one or more ROI segments, identifying clusters among occupied cells of the ROG map, the clusters representing stationary objects in a subset of the one or more parking spots;
for each of the one or more ROI segments, determining open spaces between or adjacent to the clusters, the open spaces representing unoccupied portions of each of the one or more ROI segments and being wider or narrower than a single parking spot; and dividing the open spaces respectively into the plurality of available parking spots to identify the plurality of available parking spots.

3. The method of claim 2, wherein identifying the one or more plurality of available parking spots near the host vehicle in the parking environment further comprises at least one of:
rotating and aligning the ROG map to a vehicle coordinate system;
applying a probability threshold to filter out one or more cells of the ROG map that are likely not available parking spots; or
supplementing the ROG map with vision line detections from a camera system to generate a radar-centric occupancy grid (RCOG) map for the parking environment, the vision line detections including parking-spot lines, handicap-spot markings, barriers, or curbs for the one or more parking spots in the parking environment.

4. The method of claim 3, wherein detecting the drivable aisle within the ROG map for the parking environment comprises:
identifying, using the parking-spot lines and a support-vector-machines (SVMs) analysis of the ROG map, aisle boundaries of the drivable aisle; and
determining an aisle width and a heading of the drivable aisle.

5. The method of claim 4, wherein a segment depth of the one or more ROI segments can be determined using the parking-spot lines and an angle of the clusters within the ROI segments, the segment depth being perpendicular to the aisle boundaries.

6. The method of claim 3, wherein, for each ROI segment, determining the open spaces between or adjacent to the clusters comprises:
adding padding clusters at longitudinal ends of the ROI segment, the padding clusters representing an end of the parking-spot lines within the ROI segment or an effective range of the radar sensors or the camera system;
identifying the open spaces between the padding clusters and the clusters; and
determining the selected parking spot based on the identified open spaces.

7. The method of claim 6, wherein:
longitudinal sides of the open spaces are determined using support vectors of a support-vector-machines (SVMs) analysis of the clusters or angled vectors with a predetermined angle; and
the plurality of available parking spots are identified based on the longitudinal sides.

8. The method of claim 3, wherein dividing the open spaces into the plurality of available parking spots comprises:
using the parking-spot lines to arrange bounding boxes for the plurality of available parking spots inside the open spaces; or
using a predetermined spot width and spot depth to arrange bounding boxes for the plurality of available parking spots inside the open spaces.

9. The method of claim 1, wherein the radar sensors have a field of view in an elevation dimension that allows for detections of EM signals reflected by the roadway, the elevation dimension being orthogonal to a roadway of the parking environment.

10. The method of claim 1, wherein:
the one or more sensors further includes a camera system; and
the sensor data further includes vision line detections from the camera system.

11. The method of claim 1, wherein the parking-spot characteristics comprise at least two of:
a width associated with each available parking spot;
an entry turning radius to each available parking spot;
a longitudinal distance to each available parking spot;
an identification to which side of the host vehicle each available parking spot is located;
positional coordinates for each available parking spot;
a depth of each available parking spot;
a spot type of each available parking spot; and
an angle of each available parking spot.

12. The method of claim 1, wherein the selected parking spot is determined using conditional probability distributions for the parking-spot characteristics.

13. The method of claim 1, wherein:
the parking environment comprises a parking lot, a parking structure, on-street parking spots, or a parking garage; and
controlling operating of the host vehicle to park in the selected parking spot comprises performing a front-in parking maneuver or a back-in parking maneuver.

14. A system comprising one or more processors configured to:
identify, using a radar occupancy grid (ROG) map generated based on sensor data obtained from one or more sensors of a host vehicle, a plurality of available parking spots near the host vehicle in a parking environment, the one or more sensors including the radar sensors;
determine, using the sensor data, parking-spot characteristics of each available parking spot of the plurality of available parking spots;
determine a selected parking spot among the plurality of available parking spots based on the parking-spot characteristics, wherein the selected parking spot is determined using conditional probability distributions for the parking-spot characteristics, and wherein the conditional probability distributions identify how probable each of the plurality of available parking spots is likely to be the selected parking spot given the corresponding parking-spot characteristics of that available parking spot; and
control, based on the parking-spot characteristics, operation of the host vehicle to autonomously park in the selected parking spot.

15. The system of claim 14, wherein the one or more processors are configured to identify the plurality of available parking spots near the host vehicle in the parking environment by:
detecting, using the sensor data, a drivable aisle within the ROG map for the parking environment;
identifying one or more regions-of-interest (ROI) segments to a lateral side of the drivable aisle within the ROG map, the one or more ROI segments comprising one or more parking spots in the parking environment including the plurality of parking spots;
for each ROI segment of the one or more ROI segments, identifying clusters among occupied cells of the ROG map, the clusters representing stationary objects in a subset of the one or more parking spots;
for each of the one or more ROI segments, determining open spaces between or adjacent to the clusters, the open spaces representing unoccupied portions of each of the one or more ROI segments and being wider or narrower than a single parking spot; and dividing the open spaces into the plurality of available parking spots.

16. The system of claim 15, wherein the one or more processors are further configured to identify the plurality of available parking spots near the host vehicle in the parking environment further by:
rotating and aligning the ROG map to a vehicle coordinate system;
applying a probability threshold to filter out one or more cells of the ROG map that are likely not available parking spots; or
supplementing the ROG map with vision line detections from a camera system to generate a radar-centric occupancy grid (RCOG) map for the parking environment, the vision line detections including parking-spot lines, handicap-spot markings, barriers, or curbs for the one or more parking spots in the parking environment.

17. The system of claim 16, wherein the one or more processors are configured to detect the drivable aisle within the ROG map for the parking environment by:
identifying, using the parking-spot lines or a support-vector-machines (SVMs) analysis of the ROG map, aisle boundaries of the drivable aisle; and
determining an aisle width and a heading of the drivable aisle.

18. The system of claim 16, wherein, for each ROI segment, the one or more processors are configured to determine the open spaces between or adjacent to the clusters by:
adding padding clusters at longitudinal ends of the ROI segment, the padding clusters representing an end of the parking-spot lines within the ROI segment or an effective range of the radar system or the camera system;
identifying the open spaces between the padding clusters and the clusters; and
determining the selected parking spot based on the identified open spaces.

19. The system of claim 14, wherein the radar system has a field of view in an elevation dimension that allows for detections of EM signals reflected by the roadway, the elevation dimension being orthogonal to a roadway of the parking environment.

20. A computer-readable storage media comprising computer-executable instructions that, when executed, cause a processor to:
identify, using a radar occupancy grid (ROG) map generated based on sensor data obtained from one or more sensors of a host vehicle, a plurality of available parking spots near the host vehicle in a parking environment, the one or more sensors including radar sensors;
determine, using the sensor data, parking-spot characteristics of each available parking spot of the plurality of available parking spots;
determine a selected parking spot among the plurality of available parking spots based on the parking-spot characteristics, wherein the selected parking spot is determined using conditional probability distributions for the parking-spot characteristics, and wherein the conditional probability distributions identify how probable each of the plurality of available parking spots is likely to be the selected parking spot given the corresponding parking-spot characteristics of that available parking spot; and
control, based on the parking-spot characteristics, operation of the host vehicle to autonomously park in the selected parking spot.

21. The method of claim 1, wherein the parking spot characteristics comprise, for each of the plurality of available parking spots, at least one of i) a width of the available parking spot, ii) an entry turning radius of the available parking spot, iii) an index number of available parking spot, iv) coordinates of four corners of the available parking spot, v) a depth of the available parking spot, vi) a space type of the available parking spot, vii) a classification of a vehicle neighboring the available parking spot, and vii) a shading classification of the available parking spot.

22. The method of claim 1, wherein the parking spot characteristics comprise longitudinal distances to the plurality of available parking spots.

23. The method of claim 1, wherein the parking spot characteristics comprise, for each of the plurality of available parking spots, i) a width of the available parking spot, ii) an entry turning radius of the available parking spot, iii) an index number of available parking spot, iv) coordinates of four corners of the available parking spot, and v) a depth of the available parking spot.

24. The method of claim 1, wherein the parking spot characteristics comprise, for each of the plurality of available parking spots, i) a space type of the available parking spot, ii) a classification of a vehicle neighboring the available parking spot, and iii) a shading classification of the available parking spot.

* * * * *

UNITED STATES PATENT AND TRADEMARK OFFICE
CERTIFICATE OF CORRECTION

PATENT NO. : 12,441,300 B2  
APPLICATION NO. : 18/159612  
DATED : October 14, 2025  
INVENTOR(S) : Qian Wang et al.

Page 1 of 1

It is certified that error appears in the above-identified patent and that said Letters Patent is hereby corrected as shown below:

In the Claims

Column 21, Lines 4-5: In Claim 3, before "plurality", delete "one or more"

Signed and Sealed this  
Thirtieth Day of December, 2025

John A. Squires  
*Director of the United States Patent and Trademark Office*